US012615473B1

(12) United States Patent
Kamath Koteshwara et al.

(10) Patent No.: US 12,615,473 B1
(45) Date of Patent: Apr. 28, 2026

(54) DEVICE-SPECIFIC CALIBRATION FOR ULTRASOUND EMISSIONS

(71) Applicant: Amazon Technologies, Inc., Seattle, WA (US)

(72) Inventors: Krishna Kamath Koteshwara, San Jose, CA (US); Chad A. Jackman, Sunnyvale, CA (US); Trausti Thor Kristjansson, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 18/539,015

(22) Filed: Dec. 13, 2023

(51) Int. Cl.
*H04R 29/00* (2006.01)
*H04R 1/22* (2006.01)

(52) U.S. Cl.
CPC .................................... *H04R 1/22* (2013.01)

(58) Field of Classification Search
CPC .... H04R 29/00; H04R 29/001; H04R 29/002; H04R 29/004; H04R 29/005; H04R 29/006; H04R 29/007; H04R 2205/024; H04R 2227/007
See application file for complete search history.

(56) References Cited

U.S. PATENT DOCUMENTS 10,732,258 B1 * 8/2020 Sundaram ................ G06N 3/08
10,779,084 B2 * 9/2020 Arteaga ................ H04R 3/005
10,795,018 B1 10/2020 Koteshwara
11,178,501 B2 * 11/2021 Wang ..................... H04R 3/005
11,395,091 B2 * 7/2022 Therkelsen ............ G01S 15/08
11,402,499 B1 * 8/2022 Kamath Koteshwara .................. G01S 7/539
11,513,216 B1 * 11/2022 Kamath Koteshwara .................. G01S 7/52004
12,302,073 B2 * 5/2025 McKee ................ H04R 29/004
12,422,536 B2 * 9/2025 Carminati ............ H04R 29/001
(Continued)

FOREIGN PATENT DOCUMENTS

CN 114710739 A * 7/2022 ............... H04S 7/30

OTHER PUBLICATIONS

Office Action for U.S. Appl. No. 17/171,455, mailed on Aug. 30, 2022, Koteshwara, "Device Calibration for Presence Detection Using Ultrasonic Signals", 5 Pages.

*Primary Examiner* — Ryan Robinson
(74) *Attorney, Agent, or Firm* — Eversheds Sutherland (US) LLP

(57) ABSTRACT

Techniques for calibrating user devices to account for device-specific factors that can affect the user devices' abilities to detect user movement. User devices detect user movement by emitting ultrasonic signals, and characterizing changes in signal characteristics of reflections of the ultrasonic signals off the person caused by the movement of the person. Device-specific factors may negatively affect the ability of the user devices to detect user movement. To account for these factors, device-specific frequency responses for each device may be determined across bandwidths in an ultrasonic frequency range, and the device-specific calibration data may be stored on each user device. Upon being placed in user environments, the user devices emit ultrasonic sweep signals that span the different bandwidths in the ultrasonic frequency range to determine environmental factors. The user devices may use the device-specific and environmental factors to determine optimal carrier frequencies and gain values for subsequent ultrasonic signal transmissions.

20 Claims, 16 Drawing Sheets

(56) References Cited

U.S. PATENT DOCUMENTS

| | | | | |
|---|---|---|---|---|
| 2016/0154089 | A1* | 6/2016 | Altman | G08B 29/26 367/124 |
| 2018/0233145 | A1* | 8/2018 | Bathiche | H04L 63/102 |
| 2019/0045312 | A1* | 2/2019 | Gunawan | G10L 21/0232 |
| 2020/0274509 | A1* | 8/2020 | Cengarle | H03G 3/3005 |

* cited by examiner

| FREQUENCY (KHZ) | LOUDSPEAKER ADJUSTED GAIN (DB) | MICROPHONE ADJUSTED GAIN (DB) |
|---|---|---|
| 31.0 | -0.5 | -0.1 |
| 31.5 | -1.65 | 0.25 |
| 32.0 | -3.95 | -0.5 |
| 32.5 | -5.57 | 1.13 |
| 33.0 | -6.52 | -0.13 |
| 33.5 | -4.6 | 0.05 |
| 34.0 | 0.2 | 0.12 |
| 34.5 | 3.96 | 1.05 |
| 35.0 | 5.32 | 2.56 |
| 35.5 | 6 | 2.45 |
| 36.0 | 6 | 2.58 |

800

802

```
std::tuple <int, int> get_optimal_freq(int *freqs, int num_freqs, float *foreground, float
*background, int bandwidth, float temperature, float humidity, float distance, int step_f=500)
{
   float snr[num_freqs];
   // get the required temperature and humidity offset
   float *temperature_humidity = get_temperature_humidity_offset(temperature, humidity);

   // estimate the SNR over a particular bandwidth of interest
   // to get generic estimates on different applications
   for (int fc=(bandwidth/step_f)/2; fc < num_freqs-(bandwidth/step_f)/2; fc++) {
      float foreground_est = 0;
      float background_est = 0;
      for (int b= -(bandwidth/step_f)/2; b < (bandwidth/step_f)/2; b++) {
         // get the air attenuation offset for freq and distance
         float air_attenuation = get_air_attenuation_offset(freqs[fcb], distance);
         int fcb = fc + b;

804      foreground_est += device_specific_gain[fcb]*foreground[fcb] + air_attenuation +
                   temperature_humidity[fcb];
806      background_est += background[fcb];
      }
808   snr[fc] = foreground_est/background_est;
   }
810 // get the maximum SNR frequency
   int fc = freqs[0];
   float max_snr = snr[0];
   for (int f=0; f <num_freqs; f++) {
      if (snr[f] > max_snr) {
         max_snr = snr[f];
         fc = f;
      }
   }
812 return {freqs[fc], fc};
}
```

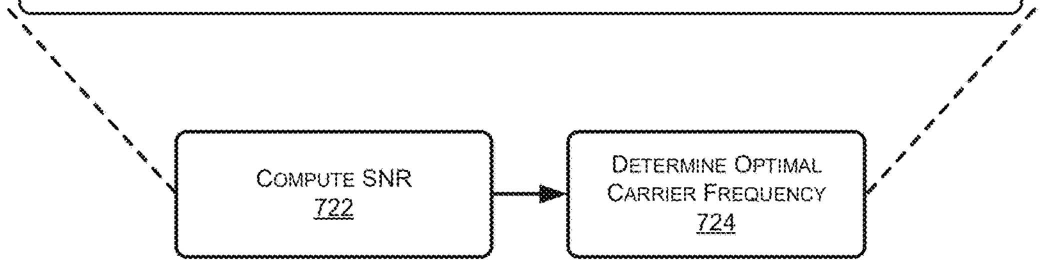

FIG. 8

CALIBRATION PROCESS 1000
CALIBRATION COMPONENT 312
EMIT ULTRASONIC SWEEP SIGNAL IN TESTING ENVIRONMENT 1002
DETERMINE GAIN FOR LOUDSPEAKER AND/OR MICROPHONE(S) 1004
STORE DEVICE-SPECIFIC CALIBRATION DATA LOCALLY ON USER DEVICE 1006
USER DEVICE PLACED IN USER ENVIRONMENT 1008
10B
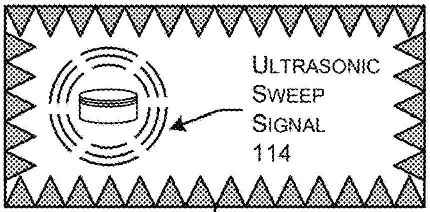
SIGNAL-PROCESSING COMPONENT 314
| | LOUDSPEAKER | MICROPHONE |
|---|---|---|
| FC (KHZ) | ADJ. GAIN (DB) | ADJ. GAIN (DB) |
| 31 | -0.5 | -0.1 |
| 32 | -1.65 | 0.25 |
| 33 | -3.95 | -0.5 |
| 34 | -5.57 | 1.13 |
| ... | ... | ... |
| 41 | 6 | 2.58 |
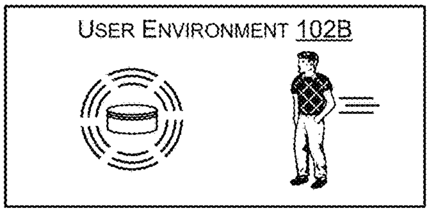
FIG. 10A

DEVICE-SPECIFIC CALIBRATION FOR ULTRASOUND EMISSIONS

BACKGROUND

Many devices and technologies exist for detecting the presence or proximity of users in different environments, and for different purposes. For instance, motion-sensing lights are used to automate lighting control based on detecting motion, motion-sensing security devices can trigger alarms upon detecting motion, etc. These devices can utilize many different technologies to detect the presence and/or proximity of a user in an environment, such as acoustic sensing, passive infrared sensing (PIR) sensing, Wi-Fi Channel Sate Information (CSI) sensing, radio-wave sensing, etc. In some examples, user devices may detect presence, proximity, or other information of a user by emitting ultrasonic signals into an environment, and characterizing signal changes that are observed in the reflections of the ultrasonic signals off the user caused by the movement of the user relative to the user devices. However, as user devices continue to be introduced into new and different environments, various difficulties may arise when attempting to detect user movement in these environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates example techniques for computing an optimal carrier frequency based on signal-to-noise ratios (SNRs) determined using device-specific gain values.

FIGS. 10A and 10B collectively illustrate a flow diagram of an example calibration process for calibrating the user device to account for device-specific factors and environment-specific factors.

DETAILED DESCRIPTION

Figure 1:
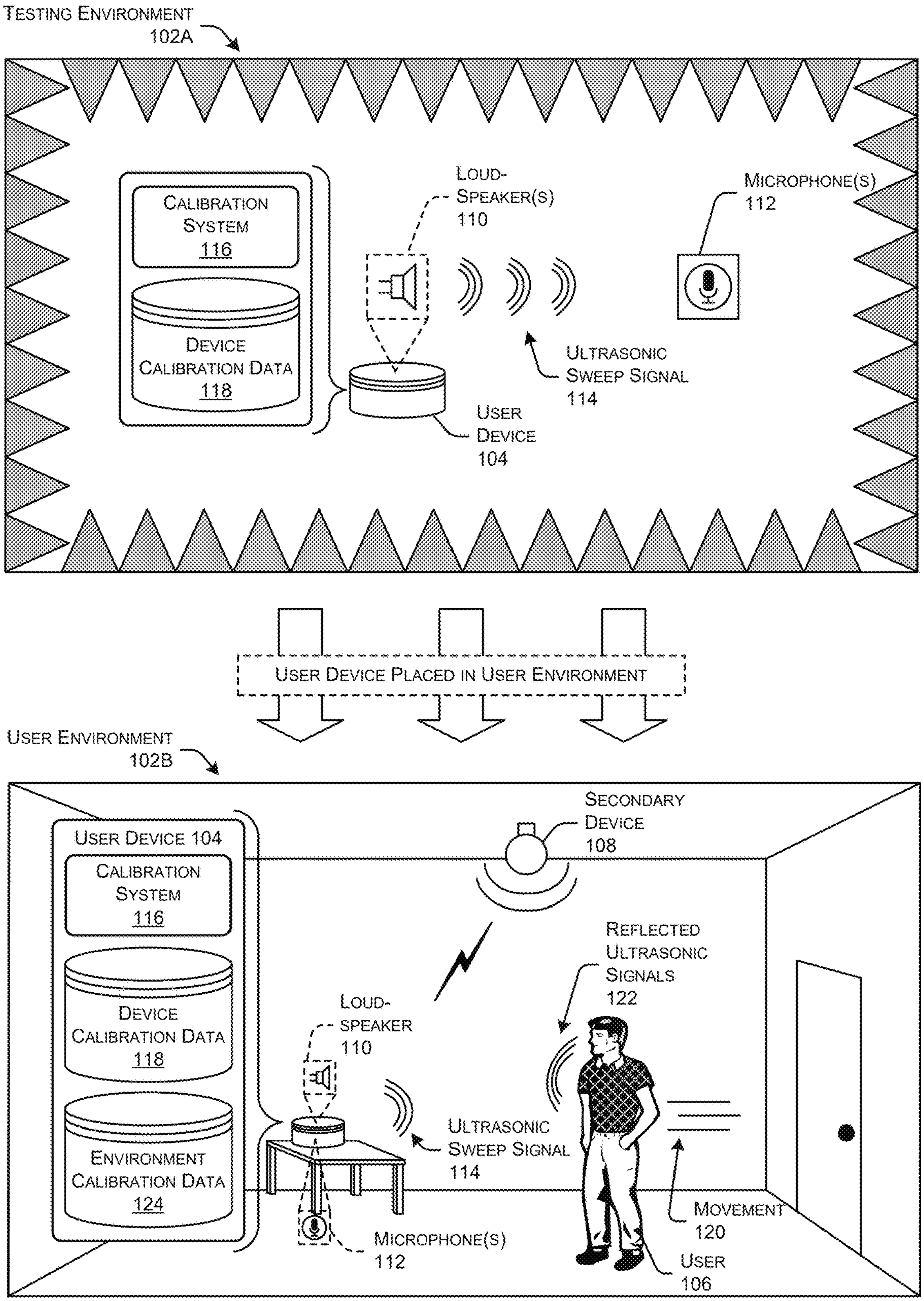
FIG. 1 shows an illustrative user device that uses ultrasound to detect movement of users. The user device is calibrated for device-specific factors in a testing environment, and upon being placed in a user environment, is calibrated for environmental factors to compensate for factors that affect performance of the user device.

This disclosure describes, in part, techniques for calibrating user devices that detect movement of users in order to account for various device-specific factors and environment-specific factors that can affect the user devices' ability to detect user movement. The user devices described herein may detect movement of a person in an environment by emitting ultrasonic signals into the environment, and characterizing changes in signal characteristics of the reflections of the ultrasonic signals off the person caused by the movement of the person relative to the user devices. However, device-specific factors (e.g., loudspeaker frequency response, microphone frequency response, device acoustic behavior etc.), as well as environment-specific factors (e.g., environmental acoustic conditions, noise sources, etc.) may negatively affect the ability of the user devices to detect movement using ultrasonic signals. To account for the device-specific factors, the frequency response of each individual device may be determined across bandwidths in an ultrasonic frequency range of interest, and that device-specific calibration data may be stored locally on each user device. Once the user devices are placed in user environments, the user devices may use their respective loudspeakers to emit one or more ultrasonic sweep signals that span the different frequencies in the ultrasonic frequency range. The user devices may generate audio data that represents reflections of the ultrasonic sweep signals, and analyze that audio data using the device-specific calibration data to determine an optimal carrier frequencies and adjusted gain values to use for subsequent ultrasonic signal transmissions.

Users place various types of electronic devices in different user environments, and use the devices to perform functions on behalf of the users. For example, a user may place a voice-interface device in a room to interact with the device through voice, a security device in a particular location to monitor the location, or a health device in a room to monitor various health attributes of a user (e.g., quality of sleep metrics, heartrate metrics, etc.). These devices may have on-board sensors (or input/output (I/O) devices) used to interact with users that are also usable for ultrasonic sensing to detect motion or other information for users (e.g., loudspeakers, microphones, etc.). Depending on the functions being performed using ultrasonic sensing, the performance of the user devices may be affected by many device-specific factors and environment-specific factors. As an example, the existing, on-board speakers are often configured to output sound within frequency ranges that are audible to humans (e.g., 35 hertz (Hz)-20 kilohertz (kHz)), and these traditional loudspeakers may have degraded performance when transmitting out-of-band ultrasonic signals (e.g., frequencies above 20 kHz) for ultrasonic sensing applications.

Depending on the ultrasonic application operating, or function being performed, performance of the user device can be affected by many device-specific factors, such as loudspeaker frequency response, microphone frequency response, and device acoustic behavior. In particular, the loudspeaker and microphone housing may have high variability in the ultrasonic frequency range due to the inherent design of these components. Accordingly, user devices that emit ultrasonic signals at different frequencies, but with the same default gain values to perform ultrasonic sensing (e.g., 10 decibels (dB), 13 dB, etc.), may end up emitting ultrasonic sound that have different decibel of sound pressure level (dB SPL) values that are representative of the actual volume or power of the emitted ultrasound.

For example, one user device that emits ultrasonic signals with a default gain of 13 dB using its loudspeaker may end up emitting ultrasound that measures around 104 dB Spl due to a frequency response of the user device, and a different user device that emits ultrasonic signals with the same default gain of 13 dB and using its respective loudspeaker may end up emitting ultrasound that measures around 99 dB Spl. Thus, different loudspeakers may be configured to emit ultrasonic signals with the same default gain, but due to inherent design or hardware differences, may end up with different actual gain values. The differences in actual gain across loudspeakers and/or microphones may vary across components produced by different manufacturers, as well as across individual components that are of the same models produced by the same manufacturer. The differences in actual gain caused by these various components can be problematic in that the ultrasound that is actually emitted may be sub-optimal for the particular ultrasonic function being performed, and can result in over-exposure to users in the environment.

The techniques described herein include calibrating user devices that detect movement of users in order to account for various device-specific factors that can affect the user devices' ability to detect user movement. The user devices may initially be placed in a testing environment in which the device-specific acoustic factors can be determined without environmental factors interfering. For instance, the user devices may be placed in an anechoic chamber or near-anechoic chamber (e.g., soundproof in the ultrasonic frequency range, soundproof down to 150 Hz, etc.), such as a room or environment designed to stop reflections or echoes of sound waves and isolated from energy entering from the surrounding areas. While in the testing environment, a microphone may be placed a predetermined distance away from the user device (e.g., 5 centimeters (cm), 10 cm, etc.). In some instances, the microphone may be the onboard microphone that is removed from the user device and placed the predefined distance from the loudspeaker, but in other examples, the microphone may simply be a different testing microphone that is calibrated to have a constant frequency response across frequency ranges. By placing the microphone a predefined distance from the loudspeaker, the microphone will be usable to determine the energy levels, and thus gain, of the ultrasound as it is received at the microphone.

The loudspeaker may begin emitting ultrasonic signals into the testing environment, such as an ultrasonic sweep signal. The ultrasonic sweep signal may generally span multiple different frequencies that are in the ultrasonic range, or frequency ranges that are inaudible to humans (e.g., frequencies above 20 kilo Hertz (kHz)). As an example, the ultrasonic sweep signal may include multiple different frequencies in between 30 kHz and 42 kHz. In an example, the ultrasonic sweep signal may be a linear sweep signal that ramps up in increments (e.g., 500 Hz increments, 250 Hz increments, etc.) from 30 kHz to 42 kHz over a period of time (e.g., 500 milliseconds (ms)). During this time, the microphone may generate audio data that represents the ultrasonic signal characteristics of the ultrasonic signal as received at the microphone. For instance, the audio data may represent frequency data of the received ultrasound, energy data indicating an amplitude of a waveform of the ultrasound, and/or other signal data. This data may be analyzed by components on the user device, and/or by a testing system, and used to determine various acoustic characteristics or factors for the loudspeaker. For instance, the audio data generally represents the actual output power of the loudspeaker (e.g., dB Spl), and the input power of the ultrasonic signal that is provided to the loudspeaker may be known. Using the input power and the output power, the user device and/or testing system may determine the power gain of the loudspeaker (e.g., 10×log (output power/input power)). This gain value may represent the actual, measured specific gain of the loudspeaker.

The user device may then determine adjusted gain values of the onboard loudspeaker using the default gain value applied to the loudspeaker for emitting ultrasonic signals (e.g., 13 dB), and the actual gain values observed by the microphone. For instance, the user device may simply subtract the default gain value from the actual/measured gain values to determine the adjusted gain values, or offset gain values, for different frequency ranges. The user device may calculate the adjusted gain values for a plurality of bandwidths within the ultrasonic frequency range of interest and store that adjusted gain values locally in a gain table on the user device. These adjusted gain values may be used to determine optimal gain values to apply to the loudspeaker when emitting ultrasonic signals at different frequencies such that the power level, or energy level, of the ultrasound signals that reflect off objects are at the levels desired or expected by the user device and applications running thereon.

In some examples, the testing environment may further be utilized to test and determine the frequency response, and adjusted gain values, of the onboard microphone(s). For instance, a specialized loudspeaker may be placed a predefined distance from the microphone housing in the user device (which may include one or more microphones), and the specialized or calibrated loudspeaker may be utilized to emit ultrasonic signals towards the microphone at a constant gain and across the ultrasonic frequency range of interest. Following the same logic above used to determine adjusted gain values for the loudspeaker, the user device may similarly use the power level at which the ultrasonic signals were emitted and the power level at which the ultrasonic signals were received by the microphone to determine the frequency response, or adjusted gain values, of the one or more microphones. The adjusted gain values may be stored in the user device, such as in a gain table, and mapped to the bandwidths or frequencies for which the adjusted gain values were determined.

Thus, device-specific calibration data, such as the adjusted gain values for the loudspeaker and/or microphones, may be stored locally in memory of the user device. Additional parameters may be stored as well, such as the distance between the loudspeaker and microphones during testing, the relative humidity of the testing environment determined using an onboard sensor of the user device or a testing device in the environment, and/or a temperature of the testing environment determined using an onboard sensor of the user device or a testing device in the environment. The user device may store this device-specific calibration data, and each user device may have its own device-specific calibration data determined in the testing environment stored locally for later use.

The user device may further perform an environmental-calibration process that is performed to determine various optimal parameters for emitting ultrasonic signals into a user environment, such as optimal carrier frequency, optimal transmission power, and/or an optimal microphone (if the device includes a microphone array). The environmental-calibration process may be initiated in response to a predefined device event, such as the user device being powered up, a pause and resume of operation of an ultrasonic application, after a predetermined period of time, etc. When the environmental-calibration process is triggered, the user device may begin using a loudspeaker to emit one or more ultrasonic sweep signals into the environment of the user device. The ultrasonic sweep signal may generally span multiple different frequencies that are in the ultrasonic range, or frequency ranges that are inaudible to humans (e.g., frequencies above 20 kHz). As an example, the ultrasonic sweep signal includes multiple different frequencies in between 30 kHz and 42 kHz. In an example, the ultrasonic sweep signal may be a linear sweep signal that ramps up from 30 kHz to 42 kHz over a period of time (e.g., 500 ms). In some instances, the ultrasonic signals emitted in the ultrasonic sweep signal may be emitted at a same default gain.

During this period of time, the user device may use a microphone to generate audio data that represents reflections of the ultrasonic sweep signal off objects in the environment. However, the audio data may also represent unwanted, background noise in the environment. Accordingly, the user device may stop emitting sound for another period of time (e.g., another 500 ms) and generate audio data that represents any background noise the environment. The audio data that is generated while the loudspeaker is not emitting any sound, or "background signals," may represent noise in the environment, and the audio data that is generated while the loudspeaker is emitting the ultrasonic sweep signal, or "foreground signals," may represent the background noise as well as the reflections of the ultrasonic sweep signal. In order to determine which frequency range in the ultrasonic sweep frequency is optimal for a carrier frequency, the user device may calculate signal-to-noise ratio (SNR) values for multiple frequency ranges within the total frequency range of the ultrasonic sweep signal. For instance, the user device may calculate an SNR value for a frequency range of 30 kHz to 30.5 kHz, an SNR value for a frequency range of 30.5 kHz to 31.0 kHz, and so forth. In order to determine SNR values for the frequency ranges, however, the user device may reduce or attenuate a representation of the noise signals from the foreground signal such that the foreground signal substantially represents the desired, reflection signals.

The user device may use the background signal that represents noise signals in the environment while the loudspeaker is not emitting sound to attenuate the noise signals from the foreground signal. The background signal may be used to identify, and remove or attenuate the noise signal from the foreground signal such that the foreground signal is substantially a representation of the reflections of the ultrasonic sweep signal. The user device may then begin accumulating energy values for the various frequency ranges of the foreground signal, and for the various frequency ranges of the background signal, into groups of energy values. For instance, the energy values for the foreground signals in the frequency range of 31.0 kHz to 31.5 kHz may be accumulated into a group of energy values. Similarly, the energy values for the background signals in the frequency range of 31.5 kHz to 32.0 kHz may be accumulated into another group of energy values. These foreground and background energy values may then be stored locally on the user device for further use when various ultrasonic applications determine to operate and perform some type of ultrasonic sensing, and desired an optimal carrier frequency and/or adjusted gain for operation.

Generally, the ultrasonic application may provide various parameters at which the application operates, such as a desired bandwidth, an expected operating distance between the user device and the monitored user, and/or other information. The user device may utilize this information to determine an optimal carrier frequency and/or optimal gain. The user device may determine to utilize the stored foreground energy values and background energy values to determine, for the desired bandwidth, which of the available bandwidths have the best SNR and thus the optimal carrier frequency. However, simply dividing the measured foreground and background energy values may not be representative of the actual SNR values for the various available frequency ranges. The user device may perform various calculations to determine the optimal carrier frequency for the different bandwidths or frequency ranges of interest. More specifically, to determine what frequency range has the most optimal SNR value (e.g., highest SNR value) for a particular application, the user device may perform calculations to estimate what the foreground energy will be in operation for each of the frequency ranges.

To determine the estimated, or predicted, foreground energy, the user device may initially apply the adjusted gain to the measured foreground energy values as a weighting factor or value, such as by multiplying the measured foreground energy by an adjusted gain value. The estimated foreground energy may then represent the expected or predicted foreground energy that can be expected when the adjusted gain is applied to the ultrasonic signals being emitted in the particular frequency range (e.g., use the adjusted gain determined in testing for the frequency range). In some instances, the estimated foreground energy may further take into account other attenuation factors, such as attenuation caused by air, temperature, and/or humidity. For instance, the application that is to perform ultrasonic sensing may provide an indication of a distance at which the movement of the user is to be monitored (e.g., within 4 feet, approximately 10 feet, etc.). The user device can then calculate an expected amount of attenuation caused by the ultrasound propagating through air. Generally, when sound travels through air, a combination of absorption, scattering, and dissipation of energy leads to a decrease in its intensity or energy of the sound. To calculate how much sound attenuation the ultrasound will undergo, the user device may utilize the inverse square law where, for each doubling of distance from the user device, the dB Spl decreases by approximately 6 dB. This relationship may be used to estimate or calculated the expected air attenuation for the operating distance of the application at hand.

Further, in instances where the user devices have sensors used to determine environmental temperature and humidity, the temperature and humidity values can be used to estimate an amount of attenuation experienced by the ultrasound due to the temperature and humidity in the user environment. Generally, the amount of absorption of ultrasound traveling through air depends on the temperature and humidity of the air. However, the attenuation caused by temperature and humidity changes based on the frequency at which the ultrasound is emitted. Generally, the higher the frequency, the greater the attenuation experienced by the ultrasound due to temperature and humidity. In some examples, one or more models or equations may be stored on the user device that represent, across the different frequency ranges, amounts of attenuation that the ultrasound may experience based on the carrier frequency at which the ultrasound is emitted, and the temperature and/or humidity of the user environment. Accordingly, the user device may use the adjusted gain determined for each frequency range along with the attenuation values expected based on the attenuation caused by sound propagating through air at different temperatures and/or humidity.

After determining the estimated or predicted foreground energy values and estimated background energy values for the various frequency ranges, the user device may use these estimated energy values to compute SNR values for the frequency ranges. For instance, the user device may divide the accumulated energy values of the estimated foreground signals by the accumulated energy values of the estimated background signals for the respective frequency ranges.

After completion of the calibration processes, the user device may begin emitting ultrasonic signals into the environment at the optimal carrier frequency and/or optimal gain and transmission power, and may further receive reflections of the signals using the optimal microphone. The user device may periodically, or continuously, emit ultrasonic signals into the environment to determine if a user is present in the room, or depending on the use-case, to monitor other information for the user. The user devices may use the loudspeaker to emit an ultrasonic signal at the determined carrier frequency and adjusted gain, and analyze audio data generate by the microphone array to sense various information for the user.

Generally, the techniques described herein may be implemented when users of the user devices have opted in for use of the different types of ultrasonic applications or services provided by the user devices. For instance, users may interact with the user device, a user account associated with the user device, and/or otherwise indicate that they would like to use the various ultrasonic services described herein and provided at least partially by the user devices.

In some examples, the techniques described herein may include various optimizations. For instance, when the user devices are playing music audio data, or otherwise outputting audio data in a human-audible frequency range, the user devices may be configured to determine how to mix the music audio data with the ultrasonic audio data in such a way that saturation is avoided. For instance, the user devices may analyze the music audio data stored in an audio buffer and determine locations at which to mix the audio data representing the ultrasonic signals in order to avoid saturation of the different audio data. Further details regarding this are described below.

While the techniques described herein may be applied and useful in many scenarios, the user devices may run or execute various types of ultrasonic applications that utilize ultrasonic signals to perform various operations. For instance, the user device may run or execute a presence-detection application configured to detect presence (movement) of a user, a proximity-sensing application configured to determine a distance, or proximity, of a user relative to the user device, a sleep-monitoring application configured to determine sleep related parameters of an enrolled user, a heartbeat-detection application configured to determine heartbeat related parameters of the enrolled user, and/or other applications.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative architecture 100 including a testing environment 102A in which a user device 104 undergoes a device-calibration process to calibrate for device-specific, and a user environment 102B in which the user device 104 undergoes an environment-calibration process to compensate for environmental factors that affect performance of the user device 104.

The user devices 104 may initially be placed in a testing environment 102A in which the device-specific acoustic factors can be determined without environmental factors interfering. For instance, the user devices 104 may be placed in testing environment 102A that is, or may include, an anechoic chamber or near-anechoic chamber (e.g., soundproof down to 150 Hz). For instance, the testing environment 102A may be or include a room or environment designed to stop reflections or echoes of sound waves and isolated from energy entering from the surrounding areas. While in the testing environment 102A, a microphone 112 may be placed a predetermined distance away from the user device 104 (e.g., 5 cm, 10 cm, etc.). In some instances, the microphone 112 may be the onboard microphone 112 that is removed from the user device 104 and placed the predefined distance from the loudspeaker 110, but in other examples, the microphone 112 may simply be a different testing microphone that has a constant frequency response across frequency ranges. By placing the microphone 112 a predefined distance from the loudspeaker 110, the microphone 112 will be usable to determine the energy levels, and thus gain, of the ultrasound as it is received at the microphone 112 112.

The loudspeaker 110 may begin emitting ultrasonic signals into the testing environment 102A, such as an ultrasonic sweep signal 114. The ultrasonic sweep signal 114 may generally span multiple different frequencies that are in the ultrasonic range, or frequency ranges that are inaudible to humans (e.g., frequencies above 20 kHz). As an example, the ultrasonic sweep signal 114 may include multiple different frequencies in between 30 kHz and 42 kHz. In an example, the ultrasonic sweep signal 114 may be a linear sweep signal that ramps up in 500 Hz increments from 30 kHz to 42 kHz over a period of time (e.g., 500 ms). During this time, the microphone 112 may generate audio data that represents the ultrasonic signal characteristics of the ultrasonic sweep signal 114 as received at the microphone 112. For instance, the audio data may represent frequency data of the received ultrasound, energy data indicating an amplitude of a waveform of the ultrasound, and/or other signal data. This data may be analyzed by components on the user device 104, and/or by a testing system, and used to determine various acoustic characteristics or factors for the loudspeaker 110. For instance, the audio data generally represents the actual output power of the loudspeaker 110 (e.g., dB Spl), and the input power of the ultrasonic signal that is provided to the loudspeaker 110 may be known. Using the input power and the output power, a calibration system 116 of the user device 104 and/or testing system may determine the power gain of the loudspeaker 110 (e.g., 10×log (output power/input power)). This gain value may represent the actual, measured specific gain of the loudspeaker 110.

The user device 104 may then determine adjusted gain values of the onboard loudspeaker 110 using the default gain value applied to the loudspeaker 110 for emitting ultrasonic signals (e.g., 13 dB), and the actual gain values observed by the microphone 112. For instance, the calibration system 116 may simply subtract the default gain value from the actual/measured gain values to determine the adjusted gain values, or offset gain values, for different frequency ranges. The calibration system 116 may calculate the adjusted gain values for a plurality of bandwidths within the ultrasonic frequency range of interest and store that adjusted gain values locally in a gain table on the user device 104. These adjusted gain values may be used to determine optimal gain values to apply to the loudspeaker 110 when emitting ultrasonic signals at different frequencies such that the power level, or energy level, of the ultrasound signals that reflect off objects are at the levels desired or expected by the user device 104 and applications running thereon.

In some examples, the testing environment 102A may further be utilized to test and determine the frequency response, and adjusted gain values, of the onboard microphone(s) 112. For instance, a specialized loudspeaker 110 may be placed a predefined distance from the microphone 112 housing in the user device 104 (which may include one or more microphones 112), and the specialized loudspeaker 110 may be utilized to emit ultrasonic signals towards the microphone 112 at a constant gain and across the ultrasonic frequency range of interest. Following the same logic above used to determine adjusted gain values for the loudspeaker 110, the user device 104 may similarly use the power level at which the ultrasonic signals were emitted and the power level at which the ultrasonic signals were received by the microphone 112 to determine the frequency response, or adjusted gain values, of the one or more microphones 112. The adjusted gain values may be stored in the user device 104, such as in a gain table, and mapped to the bandwidths or frequencies for which the adjusted gain values were determined.

Thus, device-specific calibration data 118, such as the adjusted gain values for the loudspeaker 110 and/or microphones 112, may be stored locally in memory of the user device 104. Additional parameters may be stored as well, such as the distance between the loudspeaker 110 and microphones 112 during testing, the relative humidity of the testing environment 102A determined using an onboard sensor of the user device 104 or a testing device in the environment, and/or a temperature of the testing environment 102A determined using an onboard sensor of the user device 104 or a testing device in the environment. The user device 104 may store this device-specific calibration data, and each user device 104 may have its own device-specific calibration data determined in the testing environment 102A stored locally for later use.

The architecture 100 further includes a user environment 102B in which a user 106 places the user device 104. The user environment 102B may include at least one user device 104 controlling secondary devices 108 (e.g., television, light, or any other controllable device) physically situated in the user environment 102B based on detecting presence or other information associated with a user 106. In this example, the user device 104 includes or has a loudspeaker 110 and one or more microphones 112 to detect presence, and/or lack of presence, of the user 106. The user device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

As shown in FIG. 1, the user device 104 may further perform an environmental-calibration process that is performed to determine various optimal parameters for emitting ultrasonic signals into the user environment 102B, such as optimal carrier frequency, optimal transmission power, and/or an optimal microphone 112 (if the user device 104 includes a microphone array). The environmental-calibration process may be initiated in response to a predefined device event, such as the user device 104 being powered up, a pause and resume of operation of an ultrasonic application, after a predetermined period of time, etc. When the environmental-calibration process is triggered, the user device 104 may begin using a loudspeaker 110 to emit one or more ultrasonic sweep signals 114 into the user environment 102B of the user device 104. The ultrasonic sweep signal 114 may generally span multiple different frequencies that are in the ultrasonic range, or frequency ranges that are inaudible to humans (e.g., frequencies above 20 kHz). As an example, the ultrasonic sweep signal 114 includes multiple different frequencies in between 30 kHz and 42 kHz. In an example, the ultrasonic sweep signal 114 may be a linear sweep signal that ramps up from 30 kHz to 42 kHz over a period of time (e.g., 500 ms). In some instances, the ultrasonic signals emitted in the ultrasonic sweep signal 114 may be emitted at a same default gain.

Generally, the loudspeaker 110 may comprise any type of electroacoustic transducer that convers an electric audio signal into a corresponding sound. In some instances, the loudspeaker 110 may be an existing on-board speaker configured to output sound within frequency ranges that are audible to humans, such as 35 Hz-20 kHz. However, in the illustrated example the ultrasonic sweep signal 114 may include at least a pulsed, or a continuous, emission of the signal 114 at a frequency that is outside the frequency range in which humans can hear sound (e.g., over 20 kHz). Thus, the loudspeaker may be emitting an ultrasonic sweep signal 114, such as ultrasonic signals, that are traditionally out-of-band for the loudspeaker 110.

During the user environment 102Bal-calibration process, the user device 104 may use a microphone 112 to generate audio data that represents reflections of the ultrasonic sweep signal 114 off objects in the user environment 102B. However, the audio data may also represent unwanted, background noise in the user environment 102B. Accordingly, the user device 104 may stop emitting sound for another period of time (e.g., another 500 ms) and generate audio data that represents any background noise the user environment 102B. The audio data that is generated while the loudspeaker 110 is not emitting any sound, or "background signals," may represent noise in the user environment 102B, and the audio data that is generated while the loudspeaker 110 is emitting the ultrasonic sweep signal 114, or "foreground signals," may represent the background noise as well as the reflections of the ultrasonic sweep signal 114. In order to determine which frequency range in the ultrasonic sweep frequency is optimal for a carrier frequency, the user device 104 may calculate signal-to-noise ratio (SNR) values for multiple frequency ranges within the total frequency range of the ultrasonic sweep signal 114. For instance, the user device 104 may calculate an SNR value for a frequency range of 30 kHz to 30.5 kHz, an SNR value for a frequency range of 30.5 kHz to 31.0 kHz, and so forth. In order to determine SNR values for the frequency ranges, however, the user device 104 may reduce or attenuate a representation of the noise signals from the foreground signal such that the foreground signal substantially represents the desired, reflection signals.

The user device 104 may use the background signal that represents noise signals in the user environment 102B while the loudspeaker 110 is not emitting sound to attenuate the noise signals from the foreground signal. The background signal may be used to identify, and remove or attenuate the noise signal from the foreground signal such that the foreground signal is substantially a representation of the reflections of the ultrasonic sweep signal 114. The user device 104 may then begin accumulating energy values for the various frequency ranges of the foreground signal, and for the various frequency ranges of the background signal, into groups of energy values. For instance, the energy values for the foreground signals in the frequency range of 31.0 kHz to 31.5 kHz may be accumulated into a group of energy values. Similarly, the energy values for the background signals in the frequency range of 31.5 kHz to 32.0 kHz may be accumulated into another group of energy values. These foreground and background energy values may then be stored locally on the user device 104 as environment calibration data 124 for further use when various ultrasonic applications determine to operate and perform some type of ultrasonic sensing, and desired an optimal carrier frequency and/or adjusted gain for operation.

Generally, the ultrasonic application may provide various parameters at which the application operates, such as a desired bandwidth, an expected operating distance between the user device 104 and the monitored user, and/or other information. The user device 104 may utilize this information to determine an optimal carrier frequency and/or optimal gain. The user device 104 may determine to utilize the stored foreground energy values and background energy values to determine, for the desired bandwidth, which of the available bandwidths have the best SNR and thus the optimal carrier frequency. However, simply dividing the measured foreground and background energy values may not be representative of the actual SNR values for the various available frequency ranges. The user device 104 may perform various calculations to determine the optimal carrier frequency for the different bandwidths or frequency ranges of interest. More specifically, to determine what frequency range has the most optimal SNR value (e.g., highest SNR value) for a particular application, the user device 104 may perform calculations to estimate what the foreground energy will be in operation for each of the frequency ranges.

To determine the estimated, or predicted, foreground energy, the user device 104 may initially apply the adjusted gain to the measured foreground energy values as a weighting factor or value, such as by multiplying the measured foreground energy by an adjusted gain value. The estimated foreground energy may then represent the expected or predicted foreground energy that can be expected when the adjusted gain is applied to the ultrasonic signals being emitted in the particular frequency range (e.g., use the adjusted gain determined in testing for the frequency range). In some instances, the estimated foreground energy may further take into account other attenuation factors, such as attenuation caused by air, temperature, and/or humidity. For instance, the application that is to perform ultrasonic sensing may provide an indication of a distance at which the movement of the user is to be monitored (e.g., within 4 feet, approximately 10 feet, etc.). The user device 104 can then calculate an expected amount of attenuation caused by the ultrasound propagating through air. Generally, when sound travels through air, a combination of absorption, scattering, and dissipation of energy leads to a decrease in its intensity or energy of the sound. To calculate how much sound attenuation the ultrasound will undergo, the user device 104 may utilize the inverse square law where, for each doubling of distance from the user device 104, the dB Spl decreases by approximately 6 dB. This relationship may be used to estimate or calculated the expected air attenuation for the operating distance of the application at hand.

Further, in instances where the user devices 104 have sensors used to determine environmental temperature and humidity, the temperature and humidity values can be used to estimate an amount of attenuation experienced by the ultrasound due to the temperature and humidity in the user environment. Generally, the amount of absorption of ultrasound traveling through air depends on the temperature and humidity of the air. However, the attenuation caused by temperature and humidity changes based on the frequency at which the ultrasound is emitted. Generally, the higher the frequency, the greater the attenuation experienced by the ultrasound due to temperature and humidity. In some examples, one or more models or equations may be stored on the user device 104 that represent, across the different frequency ranges, amounts of attenuation that the ultrasound may experience based on the carrier frequency at which the ultrasound is emitted, and the temperature and/or humidity of the user environment. Accordingly, the user device 104 may use the adjusted gain determined for each frequency range along with the attenuation values expected based on the attenuation caused by sound propagating through air at different temperatures and/or humidity.

After determining the estimated or predicted foreground energy values and estimated background energy values for the various frequency ranges, the user device 104 may use these estimated energy values to compute SNR values for the frequency ranges. For instance, the user device 104 may divide the accumulated energy values of the estimated foreground signals by the accumulated energy values of the estimated background signals for the respective frequency ranges.

After completion of the calibration processes, the user device 104 may begin emitting ultrasonic signals into the user environment 102B at the optimal carrier frequency and/or optimal gain (e.g., transmission power), and may further receive reflections of the signals using the microphone 112. The user device 104 may periodically, or continuously, emit ultrasonic signals into the user environment 104B to determine if the user 106 is present in the room, or depending on the use-case, to monitor other information for the user 106. The user device 104 may use the loudspeaker 110 to emit an ultrasonic signal at the determined carrier frequency and adjusted gain value, and analyze audio data generate by the microphone 112 (which may be a single microphone or a microphone array) to sense various information for the user 106.

After determining the optimal parameters, the user device 104 may begin performing techniques to detect movement of an object, such as the user 106. The user device 104 may cause the loudspeaker 110 to emit the ultrasonic sound (e.g., emitted signal) into the user environment 102B. In some examples, the user device 104 may continuously cause the loudspeaker 110 to emit the ultrasonic sound, while in other examples, the ultrasonic signal may be emitted periodically, or pulsed.

Upon being emitted, the signal will generally reflect off of objects in the user environment 102B. When the emitted signal bounces off objects, various changes to the characteristics of the audio signal may occur. For instance, the Doppler effect (or Doppler shift) is one such change in audio signal characteristics where the frequency or wavelength of a wave, such as an emitted signal wave, changes in relation to an emitting object upon bouncing off of a moving object. In the illustrated example, the emitted signal may experience a change in frequency upon reflecting off the user 106 if the user 106 is moving. Thus, because there is movement 120 by the user 106, the reflected sound 122 (or reflected signal) may experience a change in frequency. Generally, if the movement 120 of the user 106 is towards the loudspeaker, then the reflected signal may have a higher frequency compared to the emitted signal when detected at the user device 104. Conversely, the reflected sound may have a lower frequency relative to the user device 104 compared to the emitted signal when the movement 120 of the user 106 is away from the user device 104.

The user device 104 may use the microphone(s) 112 to generate audio data representing the reflected ultrasonic sound. In some examples, the microphone(s) 112 may include two or more microphones arranged on, or in, the user device 104 in any pattern (e.g., rows of microphones, circular pattern on a surface, offset and/or alternating rows of microphones, etc.). Further, the microphones in the microphone(s) 112 may be facing, or oriented, in different directions to capture sound from different directions with a better signal-to-noise ratio. Additionally, or alternatively, the user device 104 may performing acoustic processing on audio data/signals generated by the microphones of the microphone(s) 112 in order to perform beamforming to perform directional signal/sound reception in the user environment 102B. In this way, the microphones in the microphone(s) 112 may be configured to detect sound from different regions of the user environment 102B with stronger SNR values. Generally, the microphones of the array 112 may comprise transducers that convert sound (e.g., reflected sound) into electrical signals, or audio data.

The user device 104 may include one or more components which extract feature data from the audio data. In some examples, each of the microphones 112 may create an audio channel, thus creating a multi-channel flow of audio data. The components may perform various processing on the audio data channels (e.g., filtering, down sampling, Fourier transform(s), log-transform(s), etc.) prior to extracting the feature data. In some examples, the components of the user device 104 may extract magnitude feature data and phase feature data that represent the frequency of the reflected sound as detected by each microphone of the array 112 for periods of time to determine if movement 120 of the user 106 exists in the user environment 102B.

The user device 104 may classify the feature data as indicating movement in the environment 102. For instance, the user device 104 may include one or more machine-learning models that have been trained to determine whether feature data, such as magnitude feature data and/or phase feature data, indicate that reflected sounds have bounced off of a moving object, such as the user 106. Additionally, as described in more detail below, the components of the user device 104 may further be configured to determine a direction of the movement 120 of the user 106 based on the phase feature data, and also determine whether multiple users 106 are in the environment 102.

Figure 2A:
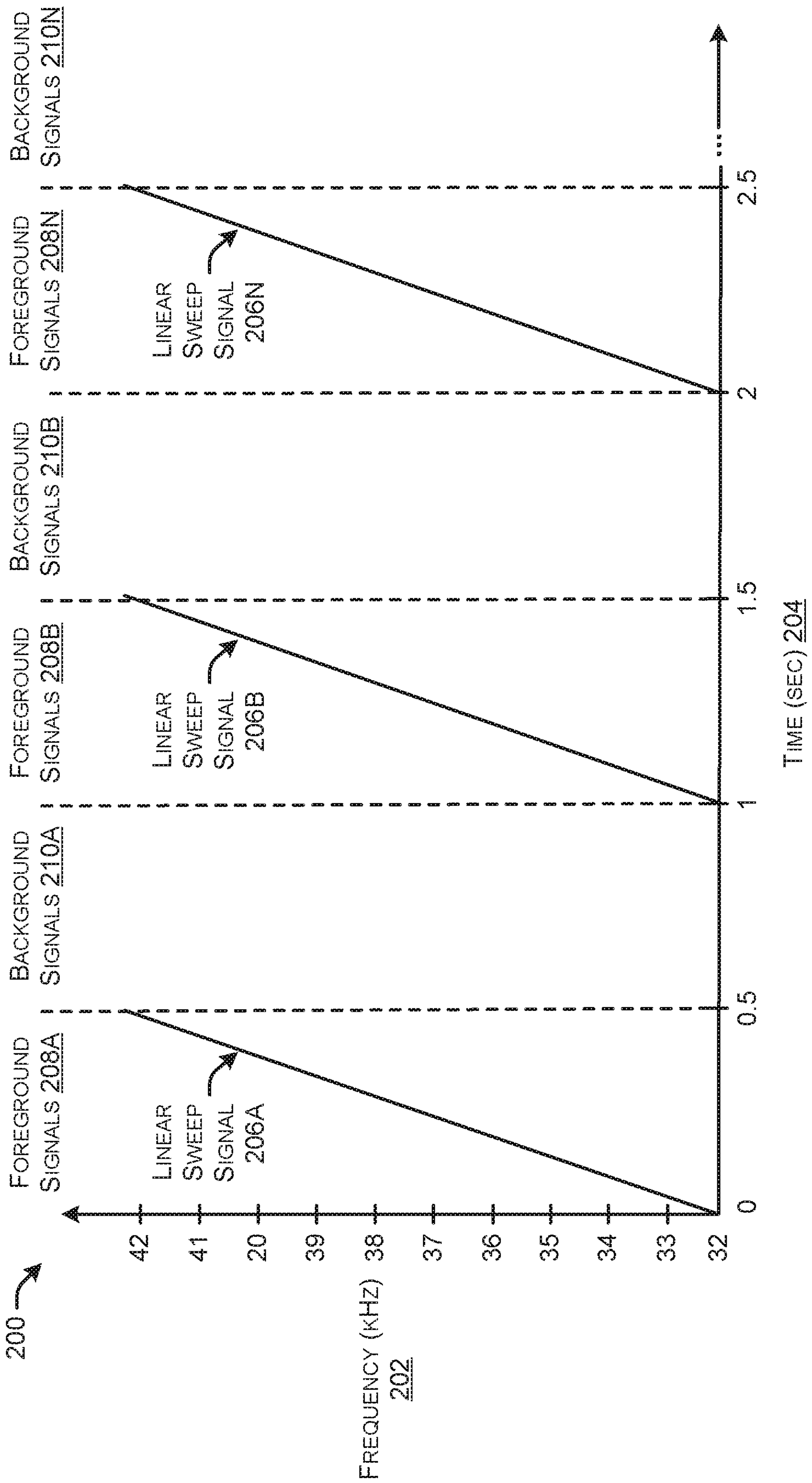
FIG. 2A illustrates an example diagram of linear sweep signals that are used in a calibration process to determine optimal carrier frequencies at which the user device is to emit ultrasonic signals.

FIG. 2A illustrates an example diagram 200 of linear sweep signals that are used in an environmental-calibration process to determine optimal carrier frequencies at which the user device 104 is to emit ultrasonic signals.

The diagram 200 includes a graph that has frequency (kHz) 202 on the y-axis and time (seconds) 204 on the x-axis. As shown, diagram 200 illustrates multiple ultrasonic sweep signals 114, in this case, linear sweep signals 206A-206N (where “N” is any integer). Although there are three linear sweep signals 206 illustrated, any number of linear sweep signals 206 may be used (e.g., 1, 4, 10, etc.). The linear sweep signals 206 are illustrated as being included in foreground signals 208A-208N, where the foreground signals 208 also include background noise in the environment 102. That is, during the periods of time corresponding to the foreground signals 208, a microphone 112 may generate audio data that represents the linear sweep signals 206 as well as background noise from the environment 102. As illustrated, the linear sweep signals 206 may be output for 500 ms, and ramp up from 32 kHz to 42 kHz. However, these values are merely illustrative and different frequency spans and different emission times may be used. During the background signal portions 210A-210N, the user device 104 may refrain from emitting sound using the loudspeaker 110 such that any noise signals received by the microphone(s) 112 is background noise from the environment 102 and other noise sources in the environment 102.

Figure 2B:
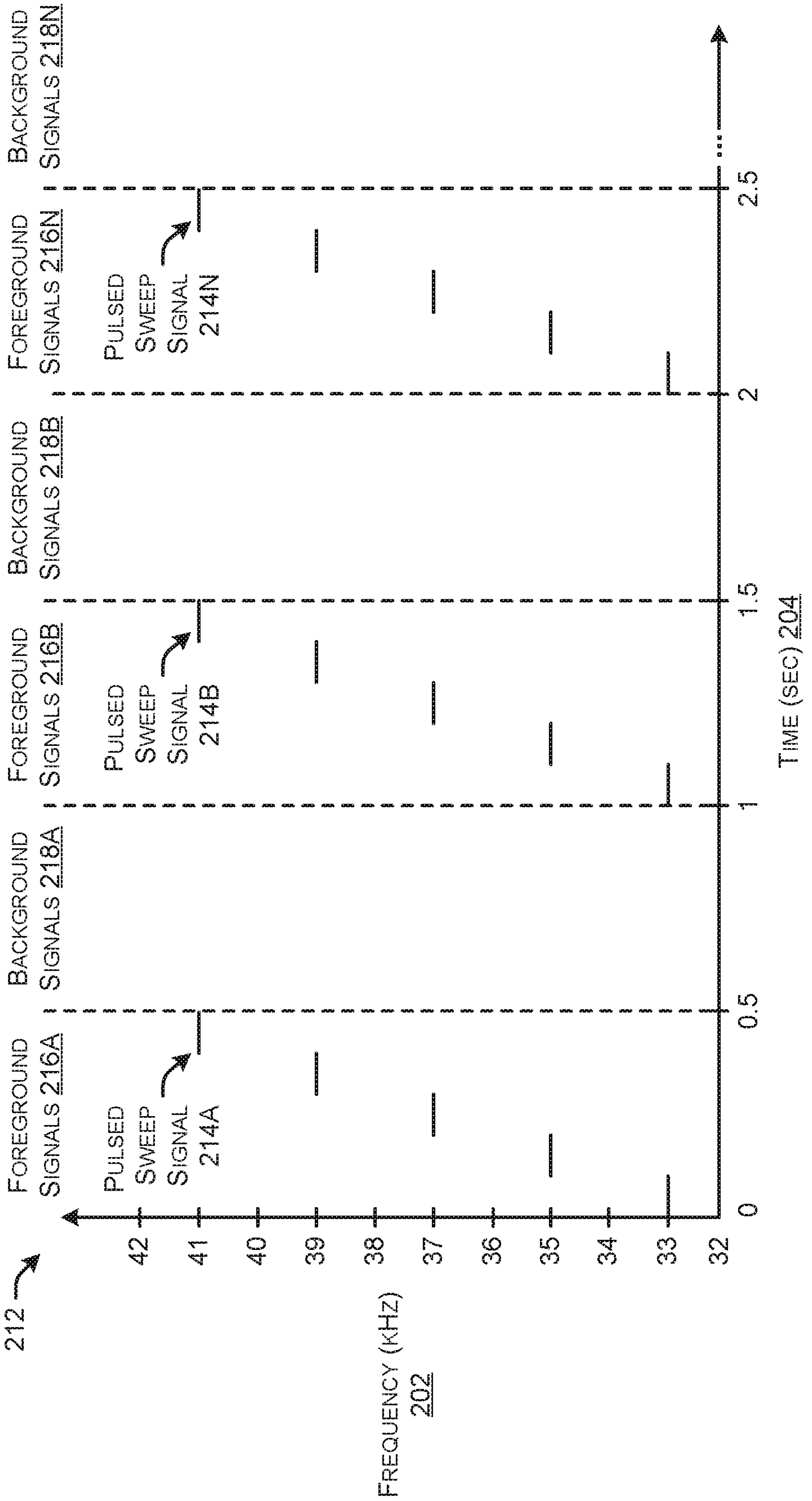
FIG. 2B illustrates an example diagram of pulsed sweep signals that are used in a calibration process to determine optimal carrier frequencies at which the user device is to emit ultrasonic signals.

FIG. 2B illustrates an example diagram 212 of pulsed sweep signals 214 that are used in a calibration process to determine optimal carrier frequencies at which the user device 104 is to emit ultrasonic signals. Rather than using a linear ramp signal for the ultrasonic sweep signal 114, the user device 104 may use pulsed sweep signals 214A-214N. Generally, the pulsed sweep signals 214 may be at, or near, candidate carrier frequencies for the user device 104.

The diagram 200 includes a graph that has frequency (kHz) 202 on the y-axis and time (seconds) 204 on the x-axis. As shown, diagram 200 illustrates multiple pulsed sweep signals 214A-214N. Although there are three pulsed sweep signals 214 illustrated, any number of linear sweep signals 206 may be used (e.g., 1, 4, 10, etc.). The pulsed sweep signals 214 are illustrated as being included in foreground signals 216A-216N, where the foreground signals 216 also include background noise in the environment 102. That is, during the periods of time corresponding to the foreground signals 216, a microphone 112 may generate audio data that represents the pulsed sweep signals 214 as well as background noise from the environment 102. As illustrated, the pulsed sweep signals 214 may be output for 100 ms for each pulse and for a total of 500 ms, and ramp up from 33 kHz to 41 kHz. However, these values are merely illustrative and different frequency spans and different emission times may be used. During the background signal portions 218A-218N, the user device 104 may refrain from emitting sound using the loudspeaker 110 such that any noise signals received by the microphone(s) 112 is background noise from the environment 102 and other noise sources in the environment 102.

When using the pulsed sweep signals 214, the user device 104 may determine SNR values using matched filter techniques where the audio data representing the foreground signals 216 is processed such that the direct path is removed or attenuated from the audio data, and the reflected/reverberated signals remain represented in the audio data. That is, the user device 104 may separate the pulsed sweep signals 214 (or "direct path") from the reverberated/reflected signals based on different time-of-arrival delay.

Figure 2C:
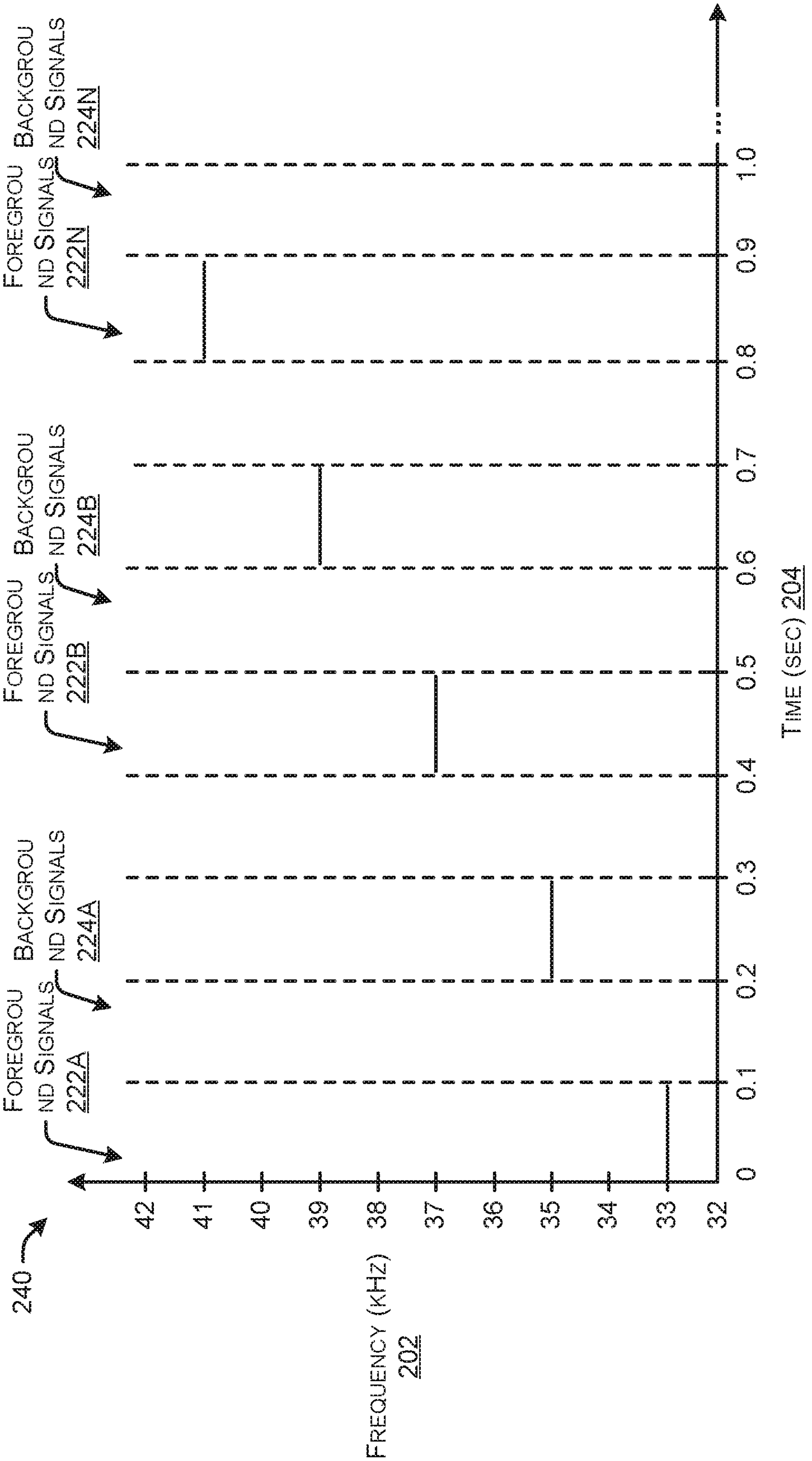
FIG. 2C illustrates another example diagram of pulsed sweep signals that are used in a calibration process to determine optimal carrier frequencies at which the user device is to emit ultrasonic signals.

FIG. 2C illustrates another example diagram 220 of pulsed sweep signals that are used in a calibration process to determine optimal carrier frequencies at which the user device 104 is to emit ultrasonic signals. Rather than using a linear ramp signal for the ultrasonic sweep signal 114, the user device 104 may use pulsed sweep signals. Generally, the pulsed sweep signals may be at, or near, candidate carrier frequencies for the user device 104.

The diagram 200 includes a graph that has frequency (kHz) 202 on the y-axis and time (seconds) 204 on the x-axis. As shown, diagram 200 illustrates multiple pulsed sweep signals. Although there are five pulsed sweep signals illustrated, any number of linear sweep signals 206 may be used (e.g., 1, 4, 10, etc.). The pulsed sweep signals are illustrated as being included in foreground signals 222A-222N, where the foreground signals 222 also include background noise in the environment 102. That is, during the periods of time corresponding to the foreground signals 222, a microphone 112 may generate audio data that represents the pulsed sweep signals as well as background noise from the environment 102. As illustrated, the pulsed sweep signals may be output for 10 ms for each pulse, and increase or ramp up from 33 kHz to 41 kHz. However, these values are merely illustrative and different frequency spans and different emission times may be used. During the background signal portions 224A-224N, the user device 104 may refrain from emitting sound using the loudspeaker 110 such that any noise signals received by the microphone(s) 112 is background noise from the environment 102 and other noise sources in the environment 102.

As illustrated in FIG. 2C, the pulsed signals may be emitted for 10 ms, followed by a period of 10 ms where background signals 224 are detectable. Thus, the ultrasonic sweep signal may include pulsed signals that are spaced by portions of time (background signals 224) where the loudspeaker 110 is not emitting sound (or not emitting ultrasonic sound). In this way, the background signals 224 may be generated in between pulsed signals where the foreground signals 222 are emitted.

When using the pulsed sweep signals, the user device 104 may determine SNR values using matched filter techniques where the audio data representing the foreground signals 222 is processed such that the direct path is removed or attenuated from the audio data, and the reflected/reverberated signals remain represented in the audio data. That is, the user device 104 may separate the pulsed sweep signals (or "direct path") from the reverberated/reflected signals based on different time-of-arrival delay.

Figure 3:
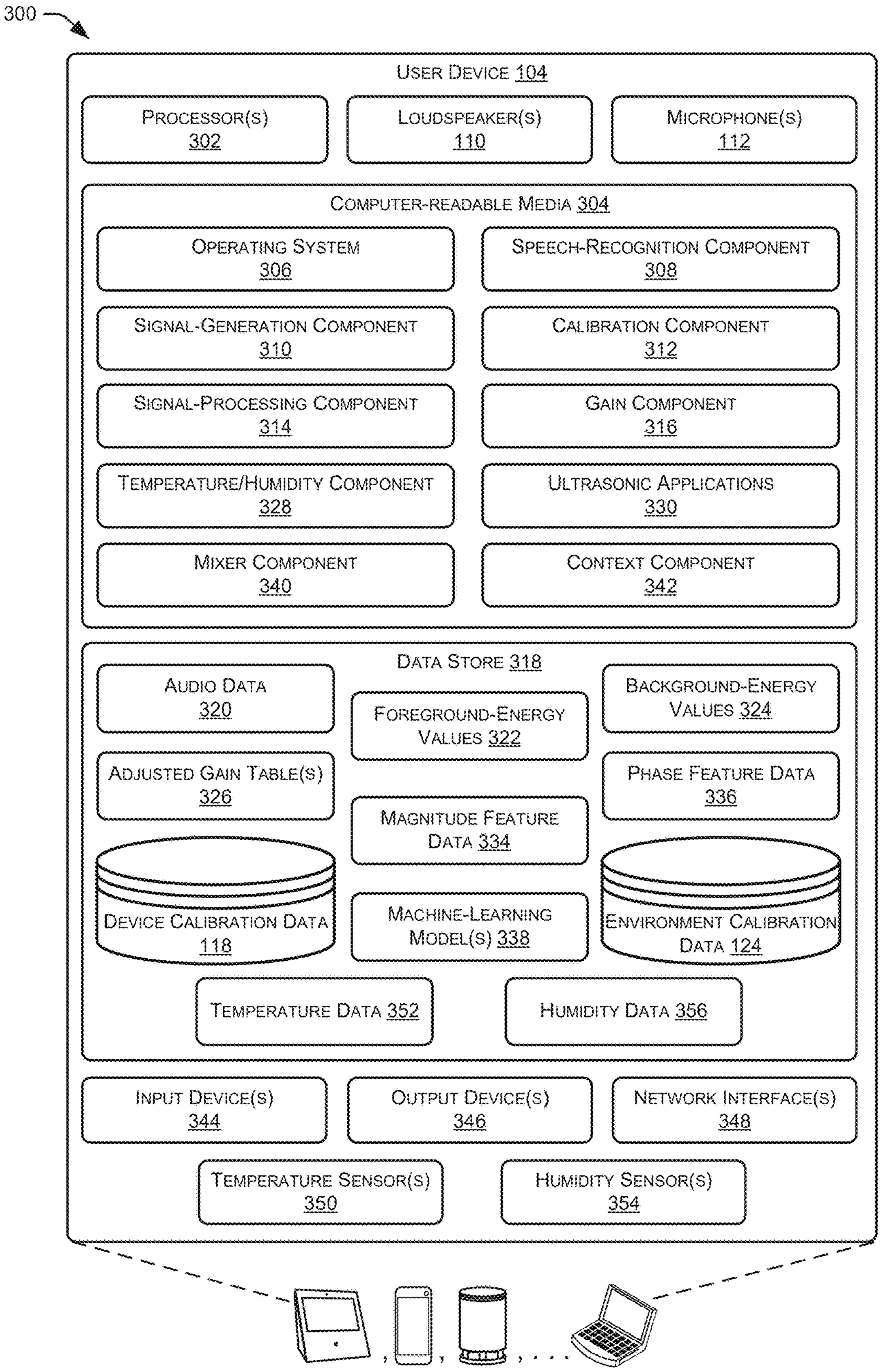
FIG. 3 illustrates an example configuration of components of a user device.

FIG. 3 illustrates an example configuration of components of a user device 104. Generally, the user device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

The user device 104 may include one or more processors 302 configured to execute various computer-executable instructions stored on the user device 104. Further, the user device 104 may include one or more loudspeakers 110 positioned at one or more locations on the user device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the user device 104.

The user device 104 may further include the one or more microphones 112, which may be a microphone array 112 that comprises multiple microphones 112 which may include transducers that convert sound into an electrical audio signal. The microphone(s) 112 may include any number of microphones that are arranged in any pattern. For example, the microphone(s) 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphone(s) 112 may be in a planar configuration, or positioned apart in a non-planar three-dimensional region. In some implementations, the microphone(s) 112 may include a spatially disparate array of sensors in data communication. For example, a networked array of sensors may be included. The microphone(s) 112 may include omni-directional microphones, directional microphones (e.g., shotgun microphones), and so on.

The user device 104 may further include computer-readable media 304 that may be used to store any number of software and/or hardware components that are executable by the processor(s) 300. Software components stored in the computer-readable media 304 may include an operating system 306 that is configured to manage hardware and services within and coupled to the user device 104. The computer-readable media may store a speech-recognition component 308 that, when executed by the processor(s) 302, perform speech-recognition on processed audio signal(s) to identify one or more voice commands represented therein. For instance, the speech-recognition component 308 may convert the audio signals into text data using automatic-speech recognition (ASR), and determine an intent for voice commands of the user 106 using natural-language understanding (NLU) on the text data. Thereafter, a command processor, stored in the computer-readable media 304 (and/ or at a remote network-based system), may cause performance of one or more action in response to identifying an intent of the voice command. In the illustrated example, for instance, the command processor may issue an instruction to control a secondary device 108. For instance, the command processor may issue one or more instructions to the television 108(1) to show the weather channel, sends an instruction to dim the light 108(2), and/or output music using a loudspeaker 110.

The computer-readable media 304 may further store a signal-generation component 310 that, when executed by the processor(s) 302 generate audio signals/data that represent sound to be output by the loudspeaker(s) 110. The signal-generation component 310 may, for example, generate audio data representing ultrasonic signals that are output by the loudspeaker(s) 110 at a frequency that is above the audible range of humans. The signal-generation component 310 may generate ultrasonic signals at various power levels depending on, for example, a size of a room that the user device 104 is in. Further, the signal-generation component 310 may generate ultrasonic signals that are converted into sound by the loudspeaker(s) 110 according to various timing implementations, such as a continuously emitted signal, a pulsed sound, a periodically pulsed sound, etc. In some examples, the signal-generation component 310 may be configured to generate a calibration signal, such as an audio sweep signal, to determine audio characteristics of a room or other environment of the user device 104.

The computer-readable media 304 may further store a calibration component 312 configured to, when executed by the processor(s) 302, determine audio characteristics of an environment of the user device 104 and/or carrier frequencies at which to output sound by the loudspeaker(s) 110. In some examples, the calibration component 312 may cause the signal-generation component 310 to generate audio data representing a calibration tone, such as an ultrasonic sweep signal, to determine audio characteristics of the environment of the user device 104. The calibration component 312 may perform device calibration to determine an optimal frequency range for ultrasonic signals to be emitted by the loudspeaker(s) 110 into the environment. In some examples, the calibration component 312 may cause the signal-generation component 310 to generate an ultrasonic sweep signal that, when converted into sound by the loudspeaker(s) 110, emits a sound over a period of time at a range of ultrasonic frequencies (e.g., 30 kHz-42 k Hz). The calibration component 312 may also activate at least one microphone in the microphone(s) 112 to generate audio data representing the ultrasonic sweep signal, and determine an optimal frequency range/bin for the environment. For instance, the calibration component 312 may analyze various frequency ranges included in the total frequency range of the ultrasonic sweep signal and determine signal-to-noise (SNR) values for one or more frequency ranges. The calibration component 312 may determine which sub-frequency range in the total frequency range of the ultrasonic sweep signal has the best SNR value.

In some examples, the calibration component 312 may cause utilize the ultrasonic sweep signal upon installation of the user device 104, after detecting movement, or the end of movement, using a sensor of the user device 104, and/or periodically in order to determine an optimal frequency at which to emit ultrasonic signals into an environment of the user device 104.

In some examples, the calibration component 312 may perform more passive techniques for determining acoustic characteristics of an environment of the user device 104. For instance, the calibration component 312 may, at least periodically, simply utilize at least one microphone in the microphone(s) 112 to generate audio data while the loudspeaker(s) 110 is not outputting sound. The calibration component 312 may analyze that audio data to determine background noise or sound in the environment of the user device 104. In this way, the calibration component 312 may detect noise that may be caused by other objects in the environment (e.g., television, ceiling fan, vacuum cleaner, etc.) that may interfere with analyzing audio data representing ultrasonic signals. In this way, the calibration component 312 may determine a background noise profile or signature that may later be used to help identify portions of audio data that represent reflections of the ultrasonic signal, rather than background noise. The calibration component 312 may provide an indication of a frequency at which to emit ultrasonic signals to the signal-generation component 310 in order to generate audio data/signals that represent the ultrasonic signals when converted by the loudspeaker(s) 110. In this way, the loudspeaker(s) 110 may emit ultrasonic signals that are at a more optimized frequency range based on audio characteristics of the environment.

The computer-readable media 304 may further include a signal-processing component 314 that, when executed by the processor(s) 302, perform various operations for processing audio data/signals generated by the microphone(s) 112. For example, the signal-processing component 314 may include components to perform low-pass filtering and/or high-pass filtering to ensure that speech and other sounds in the spectrum region of the ultrasonic signal does not affect baseband processing. For instance, the signal-processing component 314 may performing high-pass filtering for the audio data received in each audio channel for respective microphones 112 to remove sounds at lower frequencies that are outside or lower than of the frequency range of the ultrasonic signal and/or reflected signals that have shifted, such as speech (e.g., 100 Hz, 200 Hz, etc.) or other sounds in the environment. Further, the signal-processing component 314 may perform baseband carrier shifts (e.g., at 96 kHz) to shift or modulate the audio signal back to baseband frequency from the carrier frequency (e.g., 46 kHz, 21 kHz, etc.). Additionally, the signal-processing component 314 may perform low-pass filtering for each audio signal generated by each microphone in the array 112 after the baseband carrier shift to remove signals from the audio signals that are higher than a certain cutoff frequency that is higher than audio signals representing the ultrasonic signal (e.g., a cutoff frequency of than 30 kHz, 33 kHz, 35 kHz, and/or any other cutoff frequency higher than the ultrasonic signal frequency range).

In some examples, the signal-processing component 314 may perform integer down sampling, such as digital sampling, to remove certain samples from the audio signals. For example, the signal-processing component 314 may perform any form of digital down sampling or decimation to reduce the sampling rate of the audio signals, such as down sampling at a rate of 2 kHz (or another appropriate frequency). In this way, the signal-processing component 314 may produce an approximation or representation of the audio signals generated by the microphone(s) 112, but at a lower frequency rate. After down sampling the audio signals, the signal-processing component 314 may perform various signal processing, such as windowing, Fourier Transformations, and/or logarithmic transformations. For example, the signal-processing component 314 may perform various types of transforms to convert the audio signal from the time domain into the frequency domain, such as a Fourier transform, a fast Fourier transform, a Z transform, a Fourier series, a Hartley transform, and/or any other appropriate transform to represent or resolve audio signals into their magnitude (or amplitude) components and phase components in the frequency domain. Further, the signal-processing component 314 may utilize any type of windowing function on the audio data, such as the Hanning Window; the Hamming Window, Blackman window, etc. Additionally, the signal-processing component 314 may perform a logarithmic transform on the magnitude components to transform the magnitude components of the frequency of the reflected signal. For instance, due to the high-dynamic range of the magnitude components of the frequency of the reflected ultrasonic signal, and because the amount of reflection that occurs from movement of the user 106 is relatively small (may appear similar to noise), the logarithmic transform may transform the magnitude components into a larger range. After applying a logarithmic transform to the magnitude components, the change in magnitude caused by the reflection of the ultrasonic signal off of the moving object, or person, will be more easily identifiable.

In this way, the signal-processing component 314 may generate magnitude components and phase components that represent the frequency components (magnitude and phase) of the audio signals that represent reflected signals that correspond to the ultrasonic signal. Generally, the magnitude components and phase components may be complex numbers that represent the audio signals at each frequency. Thus, the magnitude components and phase components may represent frequency content for audio signals from each audio channel generated by the microphone(s) 112 after various digital processing has been performed on the audio signals by the signal-processing component 314. The magnitude components may be represented as logarithmic values (dB), and the phase components may be represented by radian and/or degree values. In this way, the signal-processing component 314 may generate magnitude components and phase components representing audio signals generated by two or more microphones in the microphone(s) 112 over a period of time (e.g., 8 seconds).

The user device 104 may further include a data store 318, which may comprise any type of storage (e.g., Random Operating Memory (ROM), disk storage, drive storage, Random-Access Memory (RAM), and/or any other type of storage). The data store 318 may store audio data 320 that represents sound, waves, signals, etc., that have been received by the microphone(s) 112. The audio data 320 may be of any type or types of audio file format usable for storing digital and/or analog audio data on a computer system. The data store 318 may also store foreground-energy values 322, which may represent energy of the foreground signals in any format indicative of power and/or energy of the foreground signals (e.g., decibels (dB), dB of sound pressure level (dB SPL), dB of hearing level (dB HL), etc.). Similarly, the data store 318 may also store background-energy values 324, which may represent energy of the background signals in any format indicative of power and/or energy of the background signals (e.g., decibels (dB), dB of sound pressure level (dB SPL), dB of hearing level (dB HL), etc.). the data store 318 may further store one of more adjusted gain tables 326. As described in more detail with respect to FIG. 6B, the adjusted gain table(s) 326 may generally represent gain values that are applied to the loudspeaker 110 based on the optimized carrier frequency at which the loudspeaker 110 is emitting ultrasonic signals.

The computer-readable media 304 may further store a feature-extraction component that, when executed by the processor(s) 302, cause the processor(s) to extract the magnitude feature data 334 and phase feature data 336 from the magnitude and phase components generated by the signal-processing component 314. The feature-extraction component may perform various operations for normalizing and stacking features of the magnitude components and phase components for each audio channel from the microphone(s) 112. For example, the feature-extraction component may receive the complex numbers (e.g., magnitude components and phase components) and remove the first order statistics. Further, the feature-extraction component may perform feature stacking to stack the magnitude components across N time intervals to create magnitude feature data 334, and stack the phase components to create phase feature data 336. In some examples, the feature-extraction component may create the phase feature data 336 may determining differences between phase components of the different audio channel paths from the microphones of the array 112.

In some examples, the feature-extraction component may further perform normalization and remove background noise. For instance, the user device 104 may, at least periodically, activate one or more microphones in the array 112 to generate audio signals representing background noise in an environment of the user device 104. The components of the user device 104 may analyze the background audio signal(s) representing the background noise, and the feature-extraction component may further create background audio data which represents the background noise. Thus, once the feature-extraction component has generated the magnitude feature data 334 and/or the phase feature data 336, the feature-extraction component may utilize the background audio data to subtract, or otherwise remove, the representation of the background noise from the magnitude feature data 334 and/or the phase feature data 336. In this way, the feature-extraction component may cause the background noise, such as a ceiling fan, a television, a refrigerator, etc., to not be represented in or by the magnitude feature data 334 and/or the phase feature data 336.

In some examples, the magnitude feature data 334 and the phase feature data 336 may generally represent binned frequency features over time, such as 1 dimensional binned frequency features over time that represent reflections of the ultrasonic signal. In various examples, the phase feature data 336 may comprise phase differences between multiple microphones, such as a phase difference between phase components of audio data generated at least in part by the respective microphones 112.

The computer-readable media 304 may further store a time-sequence classification component configured to, when executed by the processor(s) 302, input the magnitude feature data 334 and the phase feature data 336 into one or more machine-learning model(s) 338 in order to classify the magnitude feature data 334 and/or phase feature data 336 as indicating movement of an object in the environment, a direction of the movement, and/or a number of objects moving in the environment. The machine-learning (ML) model(s) 338 may comprise any type of ML model(s) 338 (e.g., neural networks, linear regression, decision tree, Naïve Bayes, etc.) that may be trained to receive magnitude feature data 334 and phase feature data 336 as inputs, and determine outputs indicating whether the magnitude feature data 334 and phase feature data 336 represent movement of an object, a direction of that movement, and/or a number of objects moving.

The time-sequence classification component may further perform various techniques to train the ML model(s) 338. For instance, an ML model(s) 338, such as a neural network, may be trained with training data (e.g., magnitude feature data 334 and phase feature data 336) that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the ML model(s) 338 may be trained to identify input feature vector as representing reflections of ultrasonic signals that reflected off a moving object, or that did not reflect off a moving object.

Further, the ML model(s) 338 may additionally be trained to identify the direction of movement of the object through the environment. The microphone(s) 112 may include multiple microphones that generate, or otherwise are used to create, multi-channel feature data for frequency components of the reflection of the ultrasonic signal, such as phase components and phase feature data 336. The ML model(s) 338 may be trained using phase feature data 336 representing the phase components, or phase feature data 336 representing differences between the phase components, from multiple microphones 112. For instance, the ML model(s) 338 may be trained to identify, based on a comparison between phase components representing the reflection of the ultrasonic signal detected by two different microphones 112, a direction of the object as it moves through the environment.

In even further examples, the ML model(s) 338 may be trained to determine a number of people in the environment that are moving. As an example, the microphone(s) 112 in the user device 104 may include multiple microphones to generate, at least partly using various components of the user device 104, phase feature data 336, the model(s) 338 may identify, from the differences in phase components for audio signals generated by multiple microphones represented in the phase feature data 336, movement at various angles (in degrees or radians) that indicate multiple objects moving. For example, the phase feature data 336 may indicate that movement is detected at substantially 180 degrees from a defined axis of the array 112, and also at substantially 30 degrees from the defined axis. The ML model(s) 338 may be trained to determine that, if the difference in the angles are large enough, or over a threshold difference, multiple objects must be moving in the environment rather than one large object.

The computer-readable media 304 may further store a context component 342 configured to, when executed by the processor(s) 302, aggregate and communicate various contextual information between components. For example, the context component 342 may receive, and potentially further analyze, calibration data received from the calibration component 312, such as environment calibration data and/or device calibration data.

Further, the context component 342 may further receive classification results data from the time-sequence classification component 332. For example, the time-sequence classification component and/or the ML model(s) 338 may analyze the magnitude feature data 334 and the phase feature data 336 and output confidence scores associated with one or more of (i) detecting movement of an object, (ii) detecting a direction of the movement, and (iii) detecting one or multiple objects moving in the environment of the user device 104. The context component 342 may be configured to determine if those confidence scores are above or below threshold values, and also determine actions for the user device 104 to perform based on the confidence scores being above or below threshold values. Generally, the threshold values may be associated with confidence values that indicate a high-degree, or sufficiently high-degree, of certainty that movement was detected, a direction of the movement, and/or that multiple objects were detected as moving. For instance, if the ML model(s) 338 outputs confidence scores that are higher than an 85% chance that movement was detected, the context component 342 may confirm or determine that movement was in fact detected and perform various operations. The confidence threshold values may be adjusted as desired, such as to err on various sides of detecting movement, or not detecting movement. For instance, the context component 342 may have fairly high threshold values in order to prevent the user device 104 from performing operations in instances where movement was incorrectly identified due to a lower threshold value.

The computer-readable media 304 may further store an audio-player component configured to, when executed by the processor(s) 302, cause the processor(s) 302 to play audio such as music songs or other audio files. The audio-player component may cause audio data to be provided to the loudspeaker(s) 110 to be converted into sound. In some examples, prior to providing the audio data to the loudspeaker(s) 110, the audio data may be stored in an audio-data buffer. In such examples, a mixer component 340 may analyze the audio data stored in the audio-data buffer and determine how to mix the audio data, such as music data, with audio data representing the ultrasonic signal such that the output sound does not experience saturation.

The computer-readable media 304 may further store and execute a gain component 316 configured to determine gain values for the loudspeaker 110 and/or microphones using various techniques (e.g., comparison of input power with output power). The computer-readable media 304 may further store a temperature/humidity component 328 configured to determine temperature data 352 and/or humidity data 356 of environments using temperature sensors 350 and/or humidity sensors 354, and/or using other techniques (e.g., ultrasonic temperature and humidity sensing techniques).

The computer-readable media 304 may further store and execute one or more ultrasonic applications 330, such as a sleep monitoring application configured to utilize ultrasonic signals to determine sleep related parameters of an enrolled user, a heartbeat detection application configured to utilize ultrasonic signals to determine heartbeat related parameters of the enrolled user, a presence-detection application configured to utilize ultrasonic signals to detect the enrolled user, or a proximity-sensing application configured to utilize ultrasonic signals to determine a distance between the enrolled user and the computing device. The ultrasonic applications 330 may emit ultrasonic signals in different frequency ranges that are optimal for those ultrasonic applications 330, and/or at different optimal gain values. The ultrasonic applications 330 may request an optimal carrier frequency that falls within one or more specified frequency ranges.

The user device 104 may comprise any type of portable and/or fixed device and include one or more input devices 344 and output devices 346. The input devices 344 may include a keyboard, keypad, lights, mouse, touch screen, joystick, control buttons, etc. The output devices 346 may include a display, a light element (e.g., LED), a vibrator to create haptic sensations, or the like. In some implementations, one or more loudspeakers 110 may function as output devices 346 to output audio sounds.

The user device 104 may have one or more network interfaces 348 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols. The network interface(s) 348 may enable communications between the user device 104 and the secondary devices 108, as well as other networked devices. Such network interface(s) can include one or more network interface controllers (NICs) or other types of transceiver devices to send and receive communications over a network.

For instance, the network interface(s) 348 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 348 may include a wide area network (WAN) component to enable communication over a wide area network. The networks may represent an array of wired networks, wireless networks, such as WiFi, or combinations thereof.

Figure 4A:
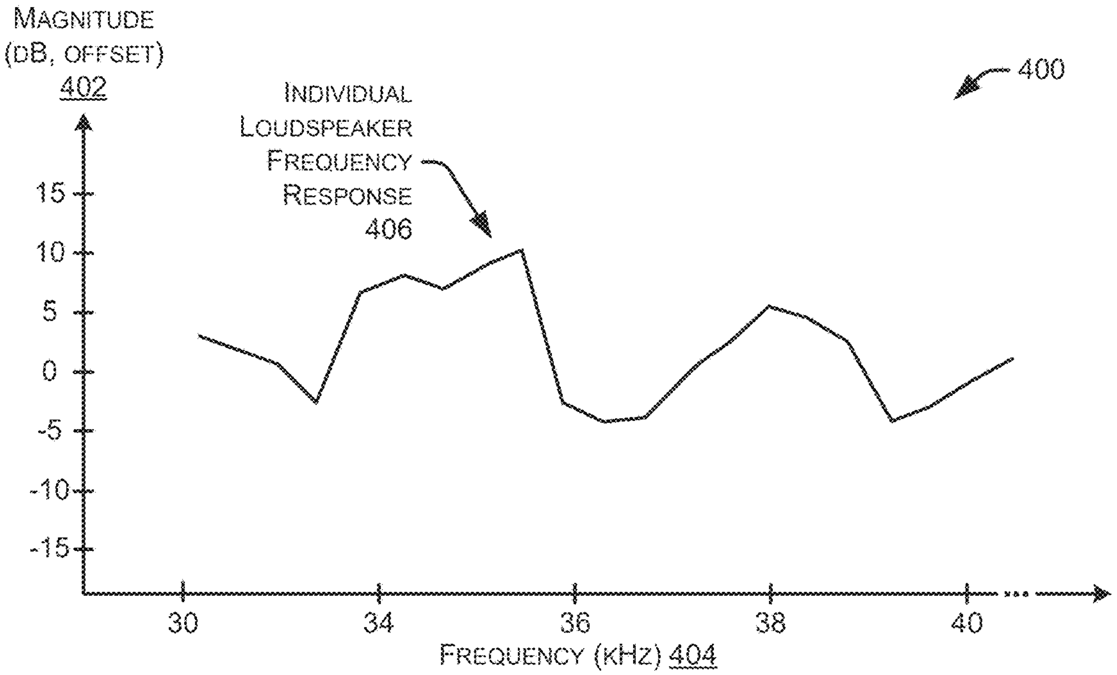
FIG. 4A illustrates an example diagram depicting variations in gain caused by a frequency response of an individual loudspeaker.

FIG. 4A illustrates an example diagram 400 depicting variations in gain caused by a frequency response of an individual loudspeaker 110. As shown, the y-axis represents magnitude offsets in dB, where the offset is relative to the default gain value. For instance, the default gain value may be 13 dB, which would correspond to a 0 dB offset. An offset on the y-axes of 5 dB would then be an actual gain of 18 dB. The x-axis illustrates or represents frequency values 404 in kHz.

As shown, an individual loudspeaker frequency response 406 may have varying dB offsets that change at different frequencies. These changes or variations in magnitude offsets (e.g., adjusted gain values), may be due to design or manufacturing differences in the loudspeaker 110 under analysis. The individual loudspeaker frequency response 406 may be used to determine adjusted gain values to apply to the default gain value in order to achieve a more normalized, constant optimal gain value for ultrasound emitted by the loudspeaker 110 at different frequencies. As an example, the offset, or adjusted gain value, for 34 kHz may be approximately 7 dB, the loudspeaker may be configured to emit ultrasonic signals at 6 dB to account for the 7 dB offset resulting in an actual gain value of 13 dB at 34 kHz.

Figure 4B:
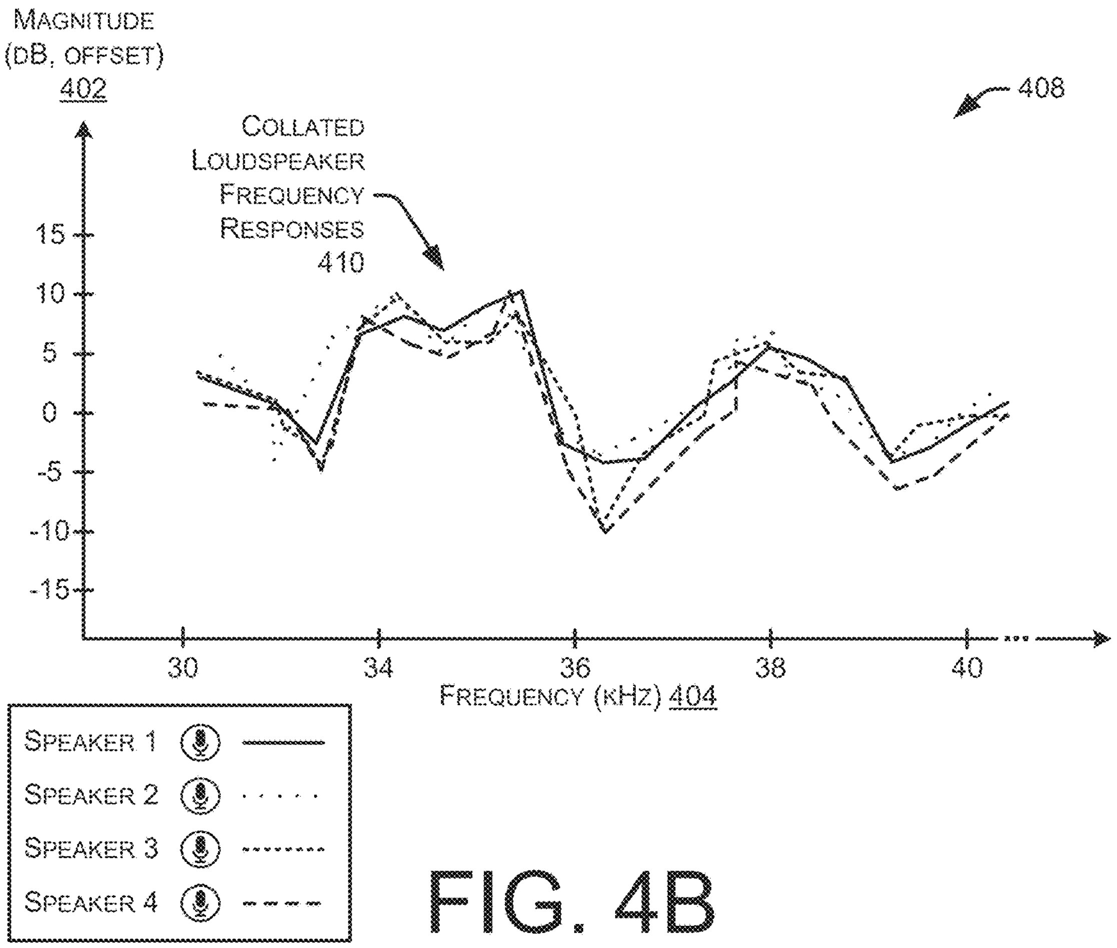
FIG. 4B illustrates an example diagram depicting collated variations in gains caused by frequency responses for a plurality of loudspeakers.

FIG. 4B illustrates an example diagram 408 depicting collated variations in gains caused by frequency responses for a plurality of loudspeakers 110.

As shown, collated loudspeaker frequency responses 410 may have varying dB offsets that change at different frequencies and at different values for the different loudspeakers 110. These changes or variations in magnitude offsets (e.g., adjusted gain values), may be due to design or manufacturing differences in the loudspeakers 110 under analysis. The collated loudspeaker frequency responses 406 may be used to determine adjusted gain values to apply to the default gain value in order to achieve a more normalized, constant optimal gain value for ultrasound emitted by the loudspeakers 110 at different frequencies.

Figure 4C:
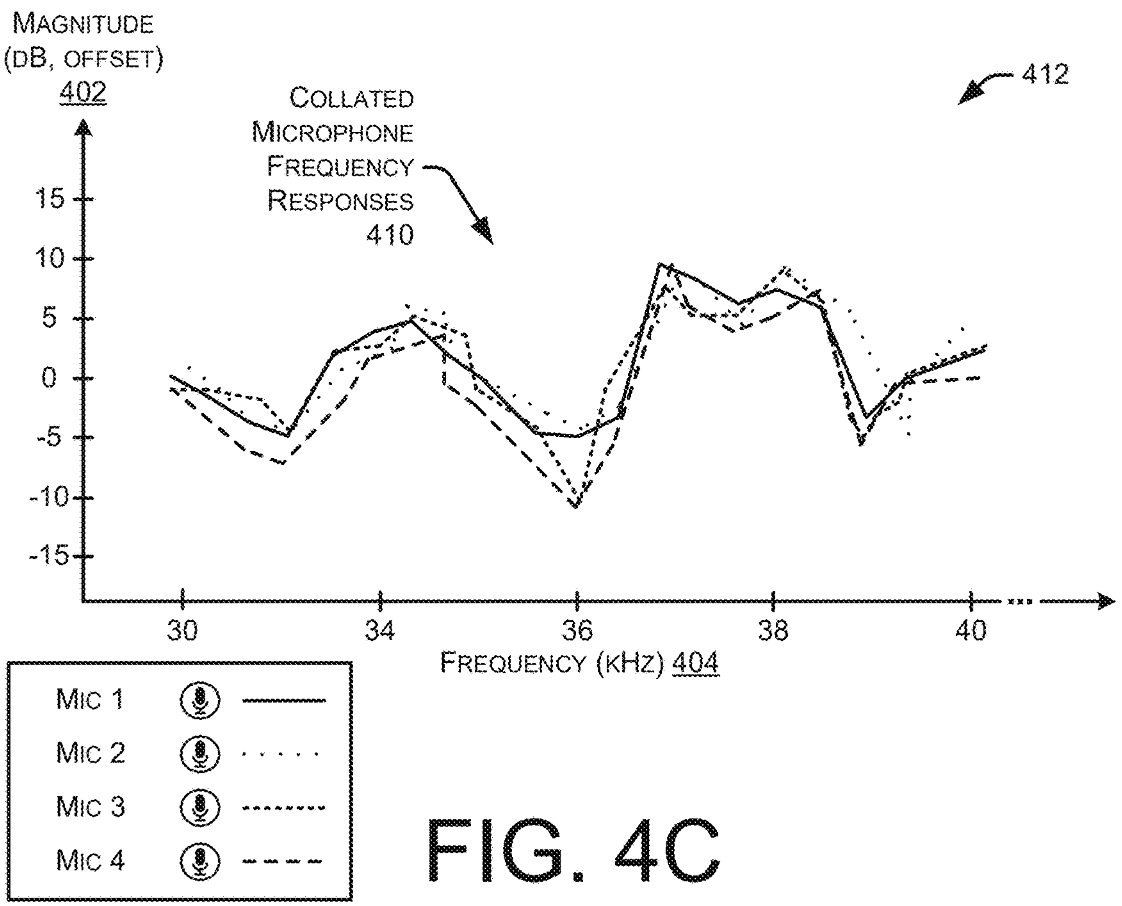
FIG. 4C illustrates an example diagram depicting collated variations in gains caused by frequency responses for a plurality of microphones.

FIG. 4C illustrates an example diagram 412 depicting collated variations in gains caused by frequency responses for a plurality of microphones. As shown, the y-axis represents magnitude offsets in dB, where the offset is relative to the default gain value. For instance, the default gain value may be 13 dB, which would correspond to a 0 dB offset. An offset on the y-axes of 5 dB would then be an actual gain of 18 dB. The x-axis illustrates or represents frequency values 404 in kHz.

As shown, collated microphone frequency responses 410 may have varying dB offsets that change at different frequencies. These changes or variations in magnitude offsets (e.g., adjusted gain values) may be due to design or manufacturing differences in the microphones 112 under analysis. The collated microphone frequency response 410 may be used to determine adjusted gain values to apply to the default gain value in order to achieve a more normalized, constant optimal gain value for ultrasound captured by the microphone 112 at different frequencies. The offsets of the loudspeakers 110 and microphones 112 may be used in conjunction to determine an overall device-specific response and thus adjusted gain values. This data and/or these values may be stored locally on the user device 104.

Figure 4D:
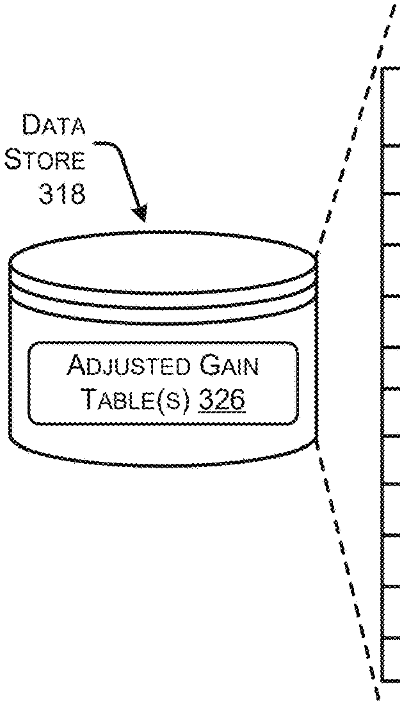
FIG. 4D illustrates an example gain table that is used to adjust the gain of a loudspeaker and a microphone depending on the carrier frequency at which an ultrasonic signal is being emitted.

FIG. 4D illustrates an example gain table 326 that is used to adjust the gain of a loudspeaker 110 and a microphone 112 depending on the carrier frequency at which an ultrasonic signal is being emitted. The adjusted gain table 326 that is used to adjust the gain of a loudspeaker 110 depending on the carrier frequency at which an ultrasonic signal is being emitted. As illustrated, the adjusted gain table 326 indicates adjust gain values that are to be applied to the loudspeaker 110 based on the loudspeaker response and microphone response in order to result in consistent transmission power level across the different carrier frequencies.

Figure 5A:
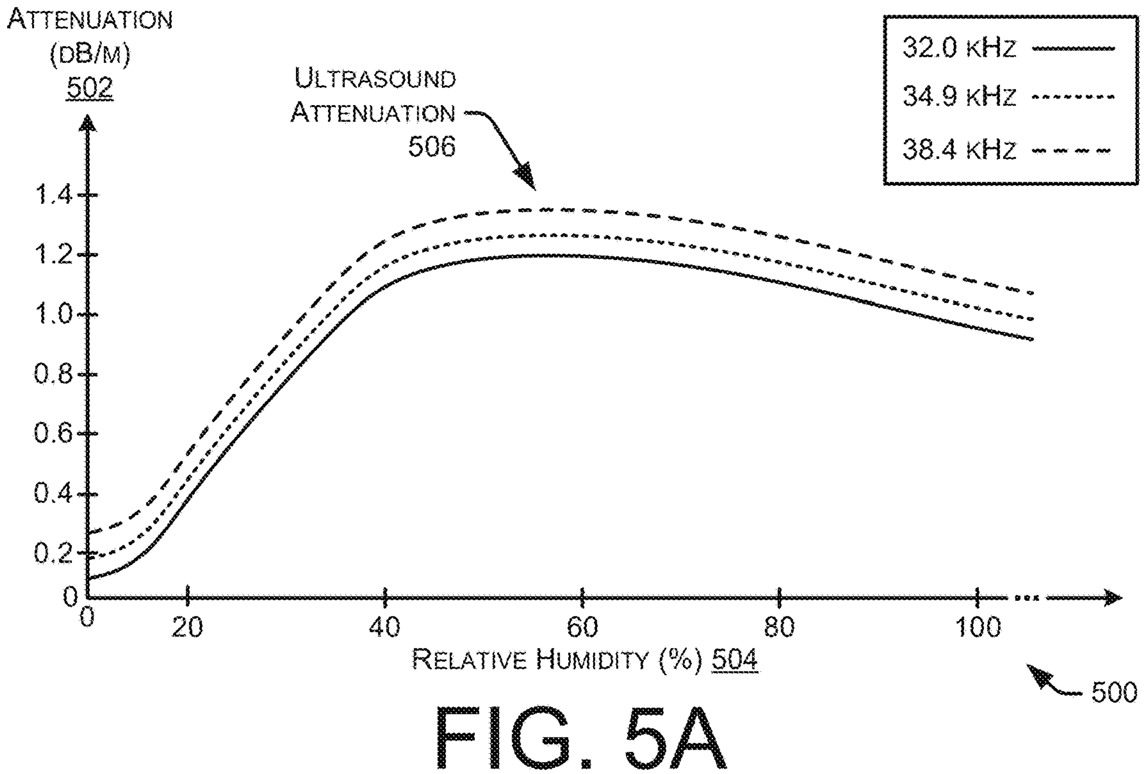
FIG. 5A illustrates an example diagram depicting attenuation values that ultrasound experience traveling through air at different relative humidity.

FIG. 5A illustrates an example diagram 500 depicting attenuation values that ultrasound experience traveling through air at different relative humidity. As shown, the y-axis has attenuation values 502 in dB per meter (dB/m), and the x-axis represents the relative humidity 504 in percentages. As shown, a representation of ultrasound attenuation 506 changes based on the relative humidity of the user environment 102B. In some examples, the values represented in the ultrasound attenuation 506 may be stored across the frequencies of interest for use in determining an adjusted gain value.

Figure 5B:
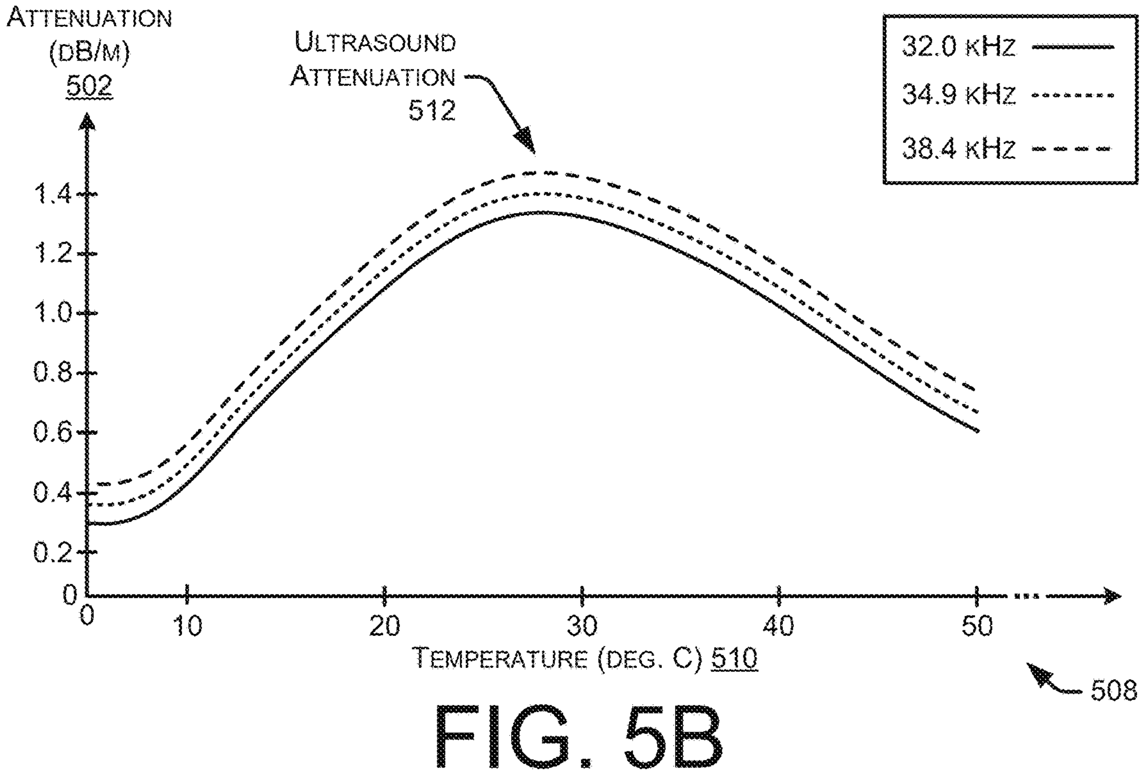
FIG. 5B illustrates an example diagram depicting attenuation values that ultrasound experience traveling through air at different temperatures.

FIG. 5B illustrates an example diagram 508 depicting attenuation values that ultrasound experience traveling through air at different temperatures. As shown, the y-axis has attenuation values 502 in dB per meter (dB/m), and the x-axis represents the temperature 510 of the user environment 102B in degrees Celsius. As shown, a representation of ultrasound attenuation 512 changes based on the temperature of the user environment 102B. In some examples, the values represented in the ultrasound attenuation 512 may be stored across the frequencies of interest for use in determining an adjusted gain value.

Generally, the attenuation values shown in FIGS. 5A and 5B for the different frequencies and frequency ranges may be stored locally on the user device 104 and used for determining optimal gains and/or carrier frequencies at which the user device 104 is to operate. In this way, when components of the user device 104 determine a temperature and/or humidity of an environment of the user device 104, the components may use that attenuation values for the respective temperature and/or humidity to determine how much attenuation can be expected for the ultrasonic signals being emitted into the environment. The attenuation values 502 may be stored for some or all of the frequencies and/or frequency ranges at which the user device 104 may operate and emit ultrasonic signals.

Figure 6:
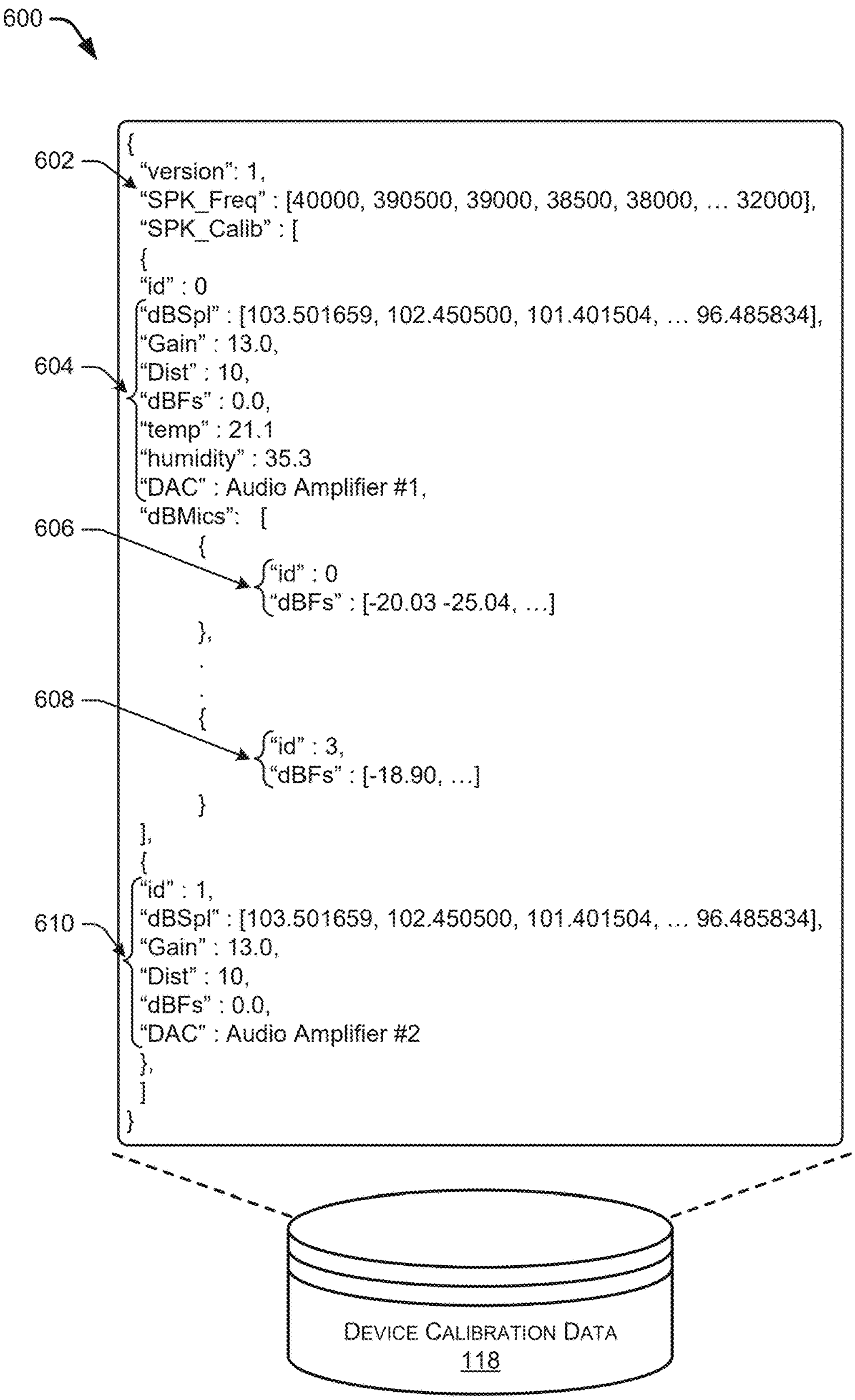
FIG. 6 illustrates an example of device-calibration data as stored on a user device that indicates device-specific gains for loudspeakers and microphones of a user device.

FIG. 6 illustrates an example diagram 600 of device-calibration data 118 as stored on a user device 104 that indicates device-specific gains for loudspeakers 110 and microphones 112 of a user device 104.

As illustrated, the device-calibration data 118 may include indications of the frequencies 602 at which ultrasonic signals were emitted in the testing environment 102A, as well as calibration values 604 stored for a specific loudspeaker 110 (e.g., dBSpl values, default gain value, a distance between the loudspeaker 110 and microphone 112, temperature and humidity values for the testing environment 102A, and the audio amplifier in the user device 104.

Further, the device-calibration data 118 may include dBFs values 606 and 608 for multiple microphones 112 of the user device 104. Additionally, the device-calibration data 118 may include second calibration values 610 for a second loudspeaker 110 of the user device 104.

Figure 7:
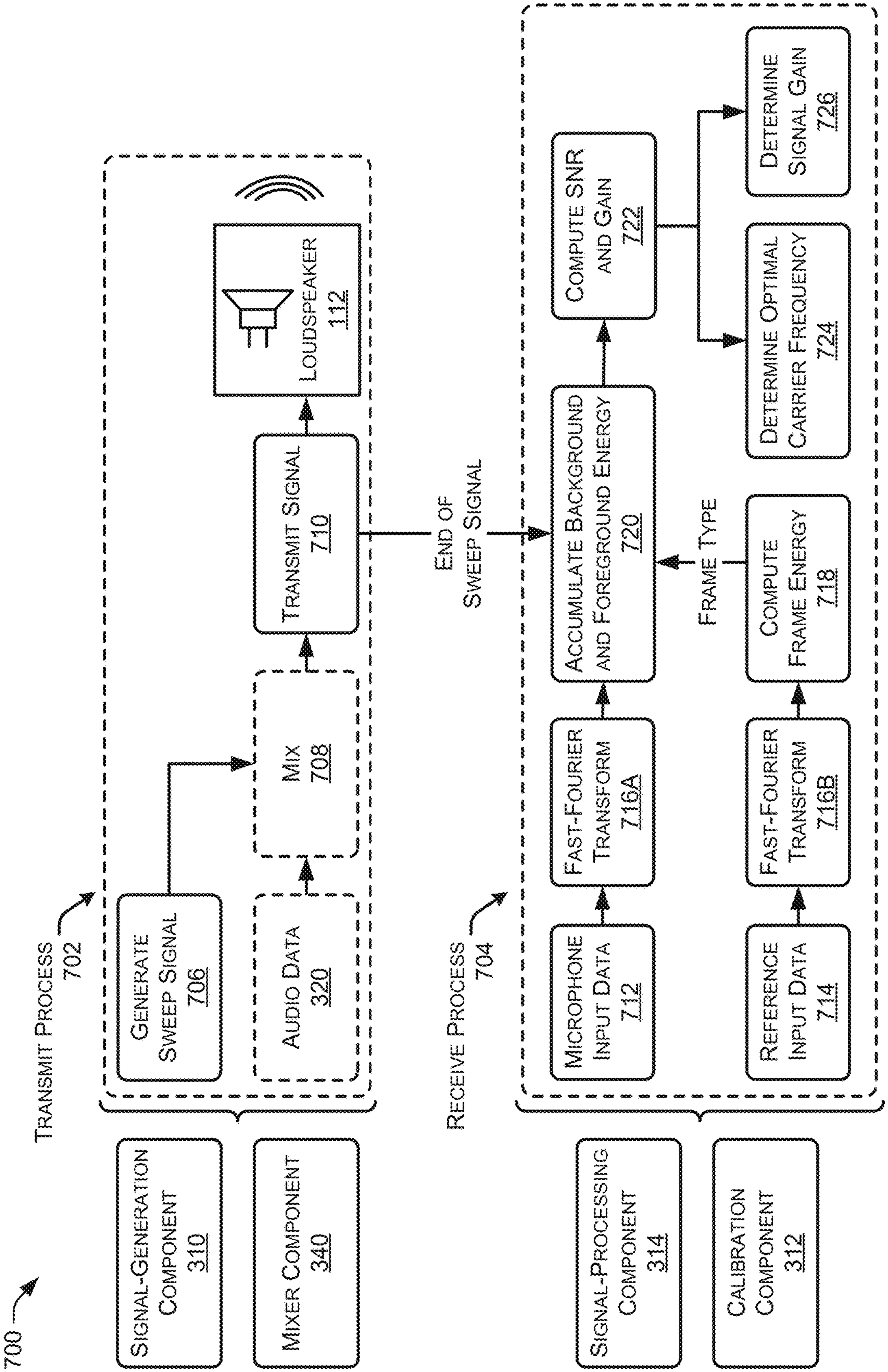
FIG. 7 illustrates an example high-level process for emitting an ultrasonic sweep signal into an environment, and analyzing audio data representing reflections of the ultrasonic sweep signal off objects in the environment to determine an optimal carrier frequency and signal gain.

FIG. 7 illustrates an example high-level process for emitting an ultrasonic sweep signal 114 into an environment 102, and analyzing audio data 320 representing reflections of the ultrasonic sweep signal 114 off objects in the environment 102 to determine an optimal carrier frequency. FIG. 7 includes a transmit process 702 for transmitting the ultrasonic sweep signal 114, and a receive process 704 for receiving reflected ultrasonic signals 122.

In the transmit process 702, the signal-generation component 310 may generate an ultrasonic sweep signal 114 at 706. The ultrasonic sweep signal 114 may generally span multiple different frequencies that are in the ultrasonic range, or frequency ranges that are inaudible to humans (e.g., frequencies above 20 kilo Hertz (kHz)). As an example, the ultrasonic sweep signal includes multiple different frequencies in between 30 kHz and 42 kHz. In an example, the ultrasonic sweep signal 114 may be a linear sweep signal that ramps up from 30 kHz to 42 kHz over a period of time (e.g., 500 ms).

In some instances, the transmit process 702 may include a mix step at 708 where audio data 320 is mixed with the ultrasonic sweep signal 114. For instance, the user device 104 may be outputting audio data 320 that represents music audio data, or other audio data in a human-audible frequency range. The mixer component 340 may be configured to determine how to mix the music audio data with the ultrasonic sweep signal audio data in such a way that saturation is avoided. However, in some instances the mix step 708 may be omitted and the ultrasonic sweep signal 114 may be the only sound output by the loudspeaker 110.

At 710, the signal-generation component 310 may transmit the resulting signal to the loudspeaker 110, and the loudspeaker 110 may emit at least one or more ultrasonic sweep signals 114 into the environment 102 of the user device 104. Further, the signal-generation component 310 may signal the end of the sweep signal to the signal-processing component 314 for use in the receive process 704.

In the receive process 704, the signal-processing component 314 may utilized microphone input data 712 (e.g., audio data 320 representing reflected ultrasonic signals 122 and any background noise) as well as reference input data 714. The reference input data 714 may correspond to audio data representing the ultrasonic sweep signal 114 such that the reference input data 714 indicates timing according to which the microphone input data 712 represents foreground signals 208 and background signals 210.

The microphone input data 712 may be transformed using a fast-Fourier transform 716A, and the reference input data 714 may also be input in a fast-Fourier transform 716B. For example, the signal-processing component 314 may perform various types of transforms to convert the audio data 712/313 from the time domain into the frequency domain, such as a Fourier transform, a fast Fourier transform, a Z transform, a Fourier series, a Hartley transform, and/or any other appropriate transform to represent or resolve the audio data 712/714 into their magnitude (or amplitude) components and phase components in the frequency domain.

At 718, the signal-processing component 314 may compute frame energy 718 for frames of the reference input data 714. The signal-processing component 314 may compute the energy at each frame and if the energy is above a threshold energy value, the frame represents foreground signals 208, and if the energy is below a threshold energy value, then the frame represents background signals 210. The signal-processing component 314 may provide indications as to the frame type to the step 720.

At 720, the signal-processing component 314 may accumulate background energy and foreground energy from the microphone input data 712 based on the frame type. Thus, when the frame type indicates foreground energy, the energy from the microphone input data 712 is stored as foreground-energy values 322. Conversely, when the frame type indicates background energy, the energy from the microphone input data 712 is stored as background-energy values 324.

At 722, the signal-processing component 314 computes the SNR values for each frequency range of the total frequency range in the ultrasonic sweep signal 114. That is, the background-energy values 324 may be used to attenuate or remove the noise signal representation from the foreground-energy values 322, and the SNR values may then be determined by dividing the foreground-energy values 322 by the background-energy values 324. At 724, the calibration component 312 may determine the optimal carrier frequency. For instance, the calibration component 312 may select a carrier frequency that is within a frequency range with the highest SNR value, or one of the highest SNR values. At 726, the calibration component 312 may determine the signal gain for the ultrasonic signals, such as the default gain combined with the adjusted gain.

FIG. 8 illustrates example diagram 800 showing techniques for computing an optimal carrier frequency based on SNRs determined using device-specific gain values. The diagram 800 shows an optimal SNR function 802 to get an optimal frequency based on a desired bandwidth for an application, and potentially a temperature and/or humidity. As shown, the optimal SNR function 802 may initially calculate an estimated foreground 804 value using device specific gain for frequencies, the measured foreground energy values from calibration, an air attenuation value, and temperature or humidity attenuation values.

The optimal SNR function 802 may use the estimated foreground 804 value and estimated background value 806 to compute SNR values 808 for the frequency ranges of interest. The optimal SNR function 802 then computes a maximum SNR frequency 810 that returns an optimal SNR frequency 812.

Figure 9:
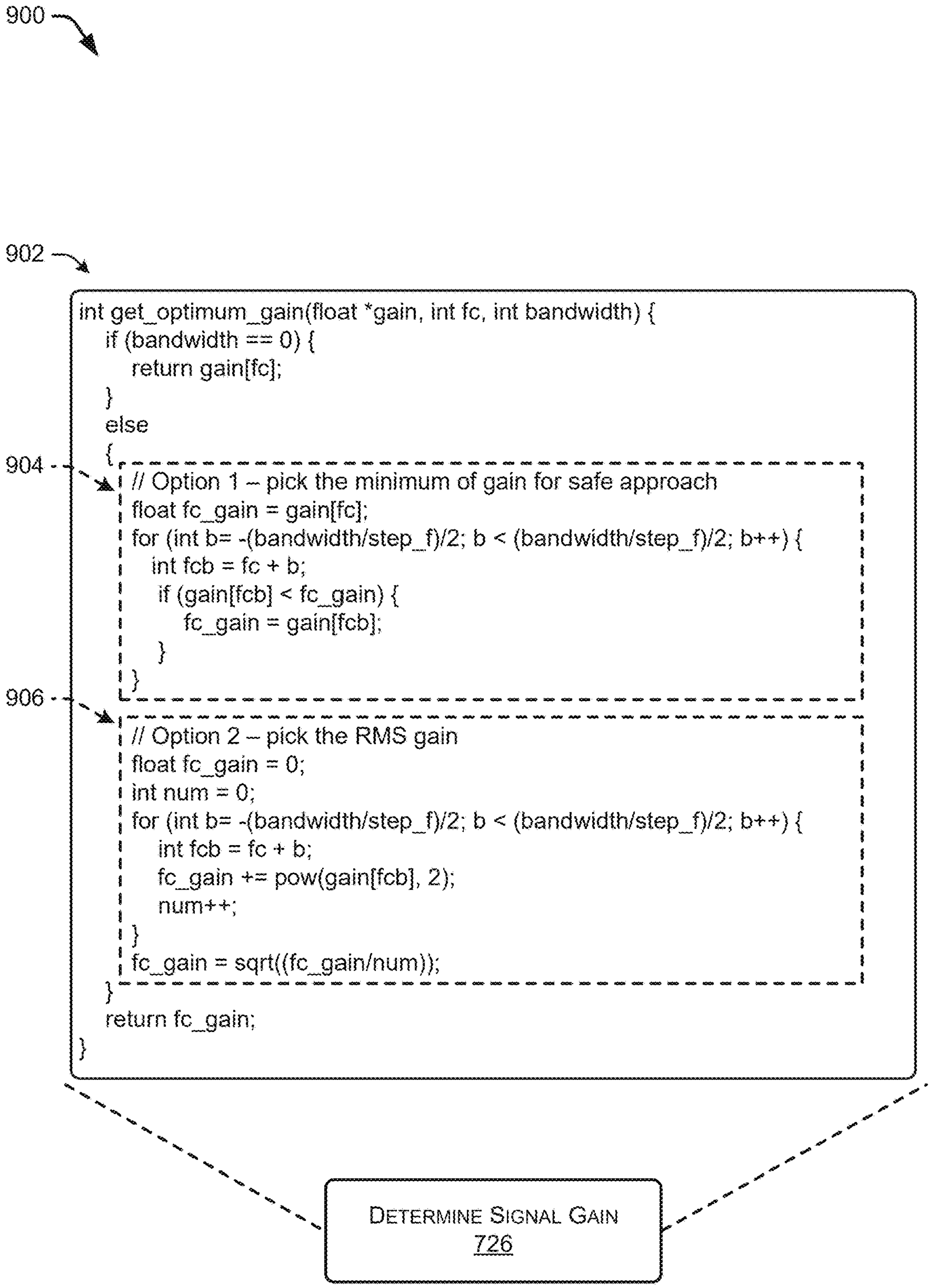
FIG. 9 illustrates example techniques for computing a signal gain at which to emit an ultrasonic signal for a particular carrier frequency using various gain computation options.

FIG. 9 illustrates example code or functions 902 for computing a signal gain at which to emit an ultrasonic signal for a particular carrier frequency using various gain computation options. An optimum gain function 902 may include a first gain option 904 and a second gain option 906. In the first gain option 904, the user device 104 may simply pick the minimum of the available gains in a frequency range to minimize mission power. In the second gain option 906, the user device 104 may calculate the root mean square (RMS) value using the various adjusted gain values for the different frequencies in the frequency range of interest.

Figure 10B:
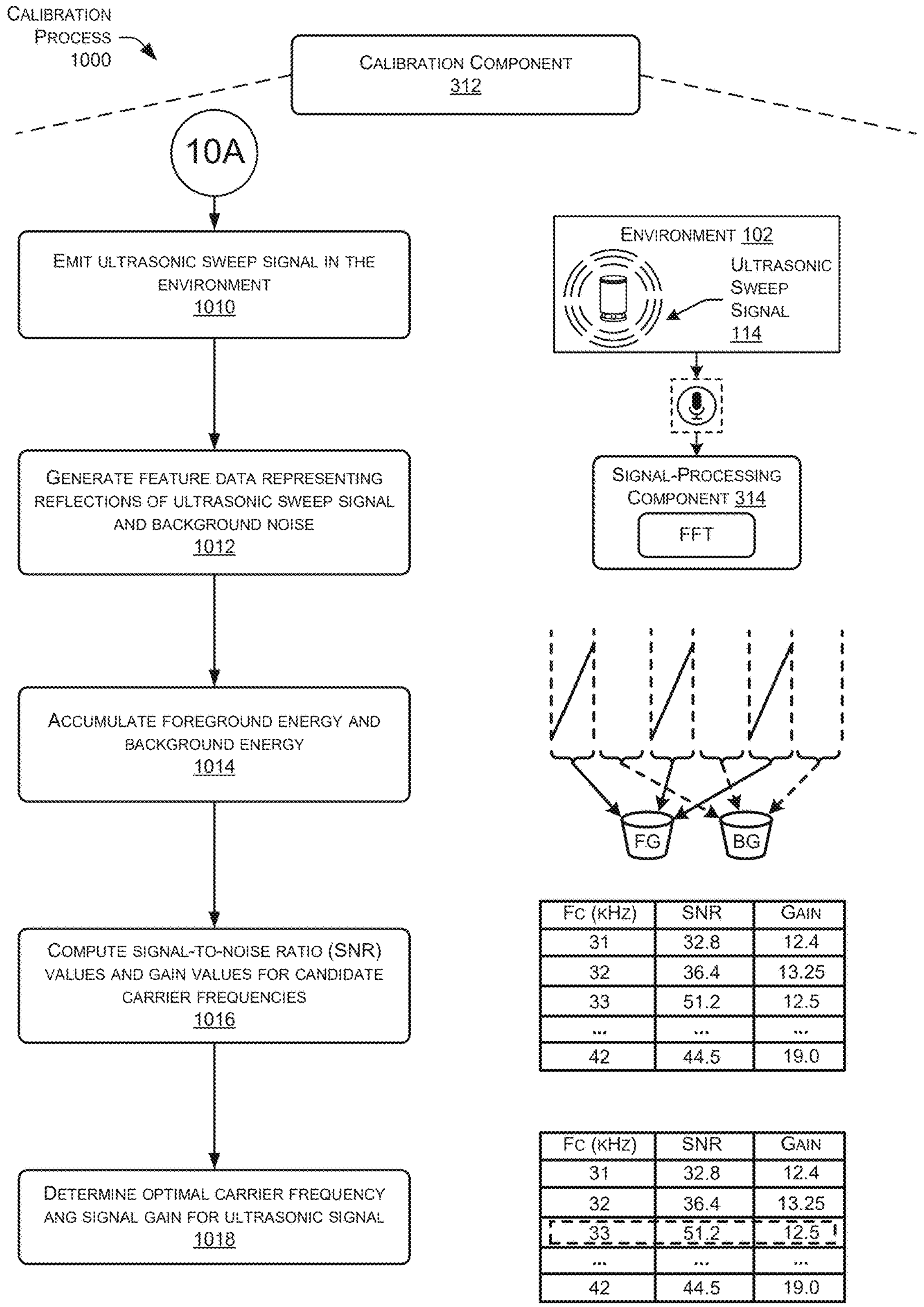
Figure 11:
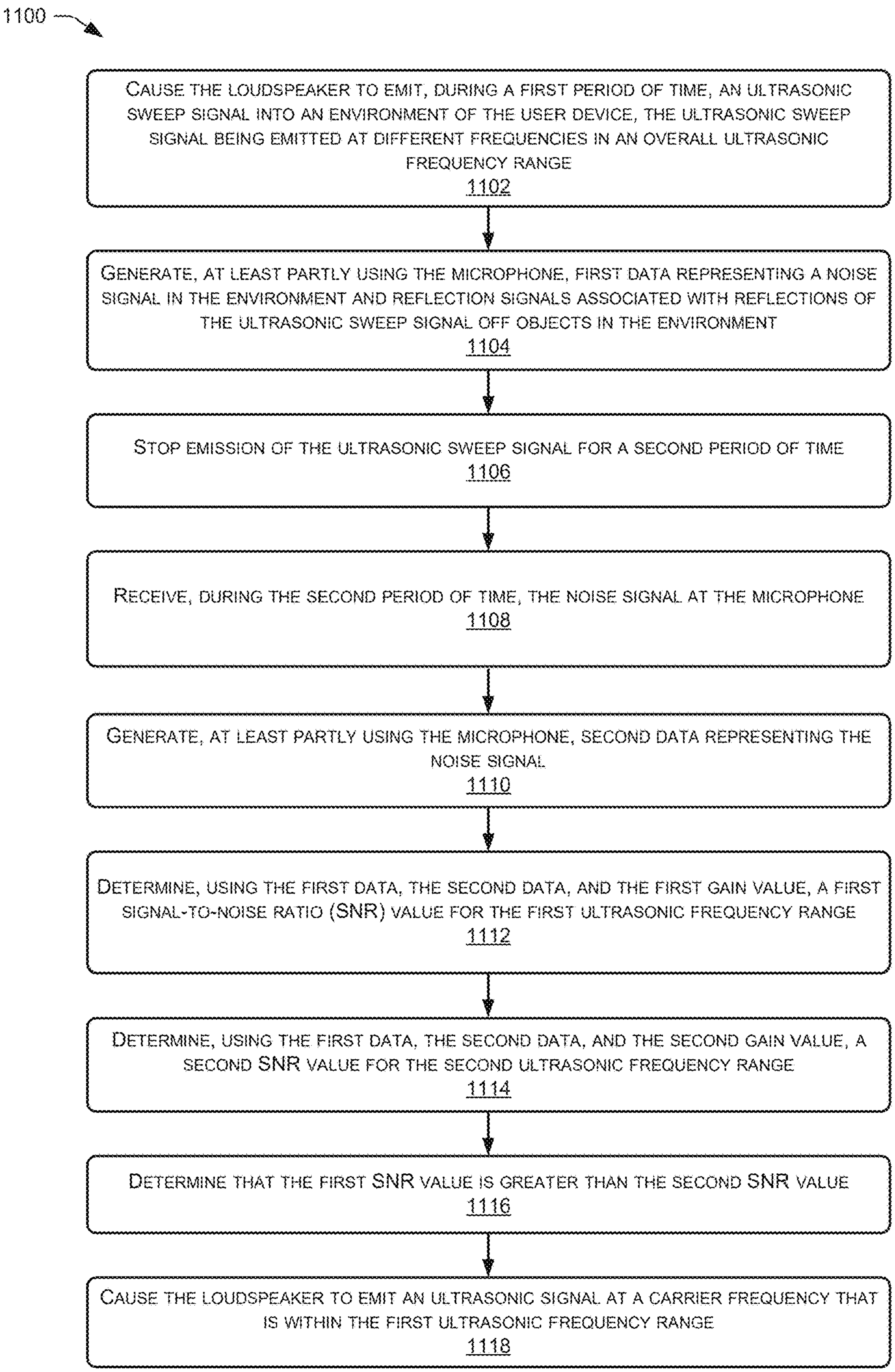
FIG. 11 illustrates a flow diagram of an example process for calibrating a user device by using an ultrasonic sweep signal to generate audio data, and using adjusted gain values and signal-to-noise ratios (SNRs) to determine an optimal carrier frequency at which to emit ultrasonic signals.
Figure 12:
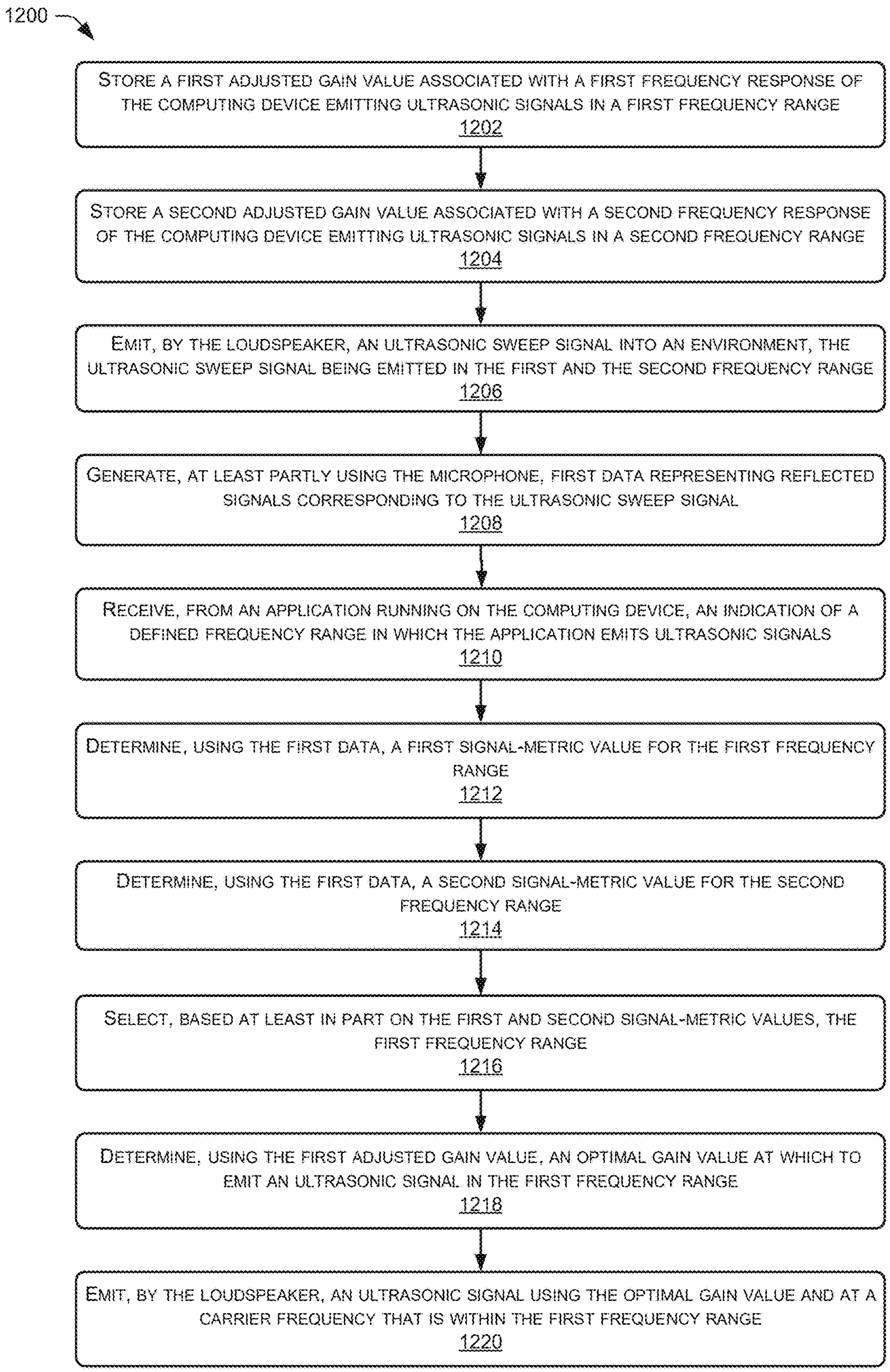
FIG. 12 illustrates a flow diagram of an example process for calibrating a user device by using an ultrasonic sweep signal to generate audio data, calculating signal-metric values for frequency ranges in the sweep signal, and determining an optimal gain value at which to emit ultrasonic signals based on adjusted gain values of the different frequency ranges.

FIGS. 10, 11, and 12 illustrate flow diagrams of example processes/methods 1000, 1100, and 1200. These processes (as well as each process or method described herein,) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIGS. 10A and 10B collectively illustrate a flow diagram 1000 of an example calibration process for calibrating the user device to account for device-specific factors and environment-specific factors.

At 1002, a user device 104 may emit an ultrasonic sweep signal 114 into a testing environment 102. The ultrasonic sweep signal 114 may be emitted at different frequencies and frequency ranges in an ultrasonic frequency range.

At 1004, the calibration system 116 may determine a gain for a loudspeaker 110 and/or microphone(s) 112 of the user device 104 across the different frequencies and frequency ranges. For instance, the calibration system may utilize various techniques to measure an amount of power used to emit the ultrasonic signals, or a power at which the ultrasonic signals are emitted, as compared to the power or energy of the ultrasonic signals as measured by the microphone 112.

At 1006, the calibration system 116 may store device-specific calibration data 118 locally on the user device 104. The device calibration data 118 may indicate adjusted gain values and/or carrier frequency information for the different ultrasonic frequency ranges.

At 1008, the user device 104 may be placed in a user environment 102B, such as by a user 106 that installs the user device 104 (e.g., powers on). At 1010, the user device 104 may emit an ultrasonic sweep signal 114 in the user environment 12B, and at 1012, the signal-processing component 314 may generate feature data that represents reflections of the ultrasonic sweep signal and background noise. For instance, the signal-processing component 314 may use FFT 416 to generate the feature data (e.g., magnitude and frequency components) that represents the reflections of the ultrasonic sweep signal 114.

At 1014, the signal-processing component may accumulate foreground energy and background energy values for the user environment 102B. The foreground energy and background energy may be accumulated into different bins or buckets based on the respective frequency ranges the energy values represent.

At 1016, the signal-processing component 314 may compute signal-to-noise values and gain values for candidate carrier frequencies as described herein. At 1018, the signal-processing component 314 may determine optimal carrier frequencies and signal gain for an ultrasonic signal. As an example, the frequency range with the best SNR value may be selected, and a signal gain that is determined using an adjusted gain for that frequency range may be used to emit ultrasonic signals.

FIG. 11 illustrates a flow diagram of an example process 1100 for calibrating a user device 104 by using an ultrasonic sweep signal 114 to generate audio data, and using adjusted gain values and signal-to-noise ratios (SNRs) to determine an optimal carrier frequency at which to emit ultrasonic signals. The user device 104 may include a loudspeaker, a microphone, and memory storing a first gain value that is associated with a first frequency response of the user device in a first ultrasonic frequency range, and a second gain value that is associated with a second frequency response of the user device in a second ultrasonic frequency range.

At 1102, the user device 104 may cause the loudspeaker to emit, during a first period of time, an ultrasonic sweep signal into an environment of the user device, where the ultrasonic sweep signal is emitted at different frequencies in an overall ultrasonic frequency range, the overall ultrasonic frequency range including the first and second ultrasonic frequency ranges.

At 1104, the user device 104 may generate, at least partly using the microphone, first data representing a noise signal in the environment and reflection signals associated with reflections of the ultrasonic sweep signal off objects in the environment. For instance, the user device 104 may collect foreground signals 208 and generate first data representing the noise signal and the reflection signals.

At 1106, the user device 104 may stop emission of the ultrasonic sweep signal for a second period of time (e.g., background signals 210 during quiet period), and at 1108, the user device 104 may receive, during the second period of time, the noise signal at the microphone (e.g., background signals 210 or noise).

At 1110, the user device 104 may generate, at least partly using the microphone, second data representing the noise signal (e.g., background-energy values 324), and at 1112, the user device 104 may determine, using the first data, the second data, and the first gain value, a first signal-to-noise ratio (SNR) value for the first ultrasonic frequency range. For instance, the foreground-energy values 322 and a first adjusted gain value may be used to compute an estimated foreground energy value, and that may be divided by the background-energy values 324 to determine the first SNR value.

At 1114, the user device 104 may determine, using the first data, the second data, and the second gain value, a second SNR value for the second ultrasonic frequency range, and at 1116, the user device 104 may determine that the first SNR value is greater than the second SNR value. At 1118, the user device 104 may cause the loudspeaker to emit an ultrasonic signal at a carrier frequency that is within the first ultrasonic frequency range.

FIG. 12 illustrates a flow diagram of an example process 1200 for calibrating a user device 104 by using an ultrasonic sweep signal to generate audio data, calculating signal-metric values for frequency ranges in the sweep signal, and determining an optimal gain value at which to emit ultrasonic signals based on adjusted gain values of the different frequency ranges.

At 1202, the user device 104 may store a first gain value associated with a first frequency response of the computing device emitting ultrasonic signals in a first ultrasonic frequency range, and at 1204, the user device 104 may store a second gain value associated with a second frequency response of the computing device emitting ultrasonic signals in a second ultrasonic frequency range.

At 1206, the user device 104 may emit, by the loudspeaker, an ultrasonic sweep signal into an environment, the ultrasonic sweep signal being emitted at least in the first frequency range and the second frequency range, and at 1208, the user device 104 may generate, at least partly using the microphone, first data representing reflected signals corresponding to the ultrasonic sweep signal.

At 1210, the user device 104 may receive, from an application running on the computing device, an indication of a particular ultrasonic frequency range in which the application emits ultrasonic signals. For instance, an ultrasonic application 330 may indicate a particular ultrasonic frequency range that the ultrasonic application 330 operates. At 1212, the user device 104 may determine, using the first data, a first signal-metric value for the first ultrasonic frequency range, the first ultrasonic frequency range corresponding to the particular ultrasonic frequency range (e.g., falling within the particular ultrasonic frequency range, at least partially overlapping with the particular ultrasonic frequency range, etc.).

At 1214, the user device 104 may determine, using the first data, a second signal-metric value for the second ultrasonic frequency range, the second ultrasonic frequency range corresponding to the particular ultrasonic frequency range, and at 1216, the user device 104 may select, based at least in part on the first and second signal-metric values, the first ultrasonic frequency range.

At 1218, the user device 104 may determine, using the first gain value, a third gain value at which to emit an ultrasonic signal in the first ultrasonic frequency range, and at 1220, the user device 104 may emit, by the loudspeaker, an ultrasonic signal using the third gain value and at a carrier frequency that is within the first ultrasonic frequency range.

As used herein, a processor, such as processor(s) 302 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 302 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 302 may possess its own local memory, which also may store program components, program data, and/or one or more operating systems.

As described herein, computer-readable media 304 and/or memory may include volatile and nonvolatile memory, removable and non-removable media implemented in any method or technology for storage of information, such as computer-readable instructions, data structures, program component, or other data. Such computer-readable media 304 and/or memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 302 to execute instructions stored on the computer-readable media 304 and/or memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 304 and/or memory, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California; Operating System Embedded (Enea OSE) as promulgated by ENEA AB of Sweden; and so forth.

The network interface(s) 348 may enable communications between the user device 104 and other networked devices. Such network interface(s) 348 can include one or more network interface controllers (NICs) or other types of transceiver devices to send and receive communications over a network.

For instance, the network interface(s) 348 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 348 may include a wide area network (WAN) component to enable communication over a wide area network. The networks that the user device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A user device comprising:

a loudspeaker;

a microphone;

memory storing:

a first gain value that is associated with a first frequency response of the user device in a first ultrasonic frequency range; and a second gain value that is associated with a second frequency response of the user device in a second ultrasonic frequency range; and one or more processors; and one or more computer-readable media storing computer-executable instructions that, when executed by the one or more processors, cause the one or more processors to perform operations comprising:

causing the loudspeaker to emit, during a first period of time, an ultrasonic sweep signal into an environment of the user device, the ultrasonic sweep signal being emitted at different frequencies in an overall ultrasonic frequency range, the overall ultrasonic frequency range including the first and second ultrasonic frequency ranges;

generating, at least partly using the microphone, first data representing a noise signal in the environment and reflection signals associated with reflections of the ultrasonic sweep signal off objects in the environment;

stopping emission of the ultrasonic sweep signal for a second period of time;

receiving, during the second period of time, the noise signal at the microphone;

generating, at least partly using the microphone, second data representing the noise signal;

determining, using the first data, the second data, and the first gain value, a first signal-to-noise ratio (SNR) value for the first ultrasonic frequency range;

determining, using the first data, the second data, and the second gain value, a second SNR value for the second ultrasonic frequency range;

determining that the first SNR value is greater than the second SNR value; and causing the loudspeaker to emit an ultrasonic signal at a carrier frequency that is within the first ultrasonic frequency range.

2. The user device of claim 1, wherein determining the first SNR value further comprising:

determining, using the first data, first energy data that includes a first energy value associated with the reflection signals in the first ultrasonic frequency range;

determining, using the first energy value and the first gain value, second energy data that includes a second energy value; and determining the first SNR value using the second energy data.

3. The user device of claim 1, the operations further comprising:

causing the loudspeaker to emit the ultrasonic sweep signal at a third gain value;

determining, using the third gain value and the first gain value, a fourth gain value; and causing the loudspeaker to emit the ultrasonic signal according to the fourth gain value and at the carrier frequency.

4. A computer-implemented method comprising:

emitting, by a computing device and during a first period of time, an ultrasonic sweep signal into an environment, the ultrasonic sweep signal being emitted at different frequencies within a frequency range;

generating, by the computing device and during the first period of time, first data representing reflected signals and a noise signal, the reflected signals corresponding to the ultrasonic sweep signal;

generating, by the computing device and during a second period of time, second data representing the noise signal;

identifying a first gain value associated with a first frequency response of the computing device emitting ultrasonic signals in a first frequency range that is within the frequency range;

determining, using the first data and the first gain value, a first signal-to-noise ratio (SNR) value for the first frequency range;

identifying a second gain value associated with a second frequency response of the computing device emitting ultrasonic signals in a second frequency range that is within the frequency range;

determining, using the first data and the second gain value, a second SNR value for the second frequency range;

determining that the first SNR value is greater than the second SNR value; and emitting, by the computing device, an ultrasonic signal at a carrier frequency that is within the first frequency range.

5. The computer-implemented method of claim 4, further comprising:

receiving, from an application executing on the computing device, an indication of a distance between the computing device and a location in the environment;

determining an attenuation value indicating a measure of attenuation the ultrasonic signal experiences over the distance;

determining, using the attenuation value and the first gain value, a third gain value; and emitting, by the computing device, the ultrasonic signal according to the third gain value.

6. The computer-implemented method of claim 4, further comprising:

emitting the ultrasonic sweep signal at a third gain value;

determining, using the third gain value and the first gain value, a fourth gain value; and causing the loudspeaker to emit the ultrasonic signal according to the fourth gain value and at the carrier frequency.

7. The computer-implemented method of claim 4, further comprising:

determining, using the first data, first energy data that includes a first energy value associated with the reflection signals in the first frequency range;

determining, using the first energy value and the first gain value, second energy data that includes a second energy value; and determining the first SNR value using the second energy data.

8. The computer-implemented method of claim 4, further comprising:

receiving temperature data indicating a temperature of the environment;

determining an attenuation value indicating a measure of attenuation the ultrasonic signal experiences due to the temperature of the environment;

determining, using the attenuation value and the first gain value, an optimal gain value; and emitting the ultrasonic signal according to the optimal gain value.

9. The computer-implemented method of claim 4, further comprising:

receiving humidity data indicating a humidity of the environment;

determining an attenuation value indicating a measure of attenuation the ultrasonic signal experiences due to the humidity of the environment;

determining, using the attenuation value and the first gain value, a third gain value; and emitting the ultrasonic signal according to the third gain value.

10. The computer-implemented method of claim 4, further comprising:

identifying a plurality of gain values associated with frequency responses of the computing device for different frequencies within the first frequency range; and determining that the first gain value is less than others of the plurality of gain values.

11. The computer-implemented method of claim 4, further comprising:

identifying, from memory of the computing device, a plurality of gain values associated with frequency responses of the computing device for different frequencies within the first frequency range;

wherein identifying the first gain value includes calculating a root mean square (RMS) value of the plurality of gain values.

12. The computer-implemented method of claim 4, further comprising:

emitting the ultrasonic sweep signal at a third gain value;

determining a fourth gain value using the third gain value and the first gain value;

determining that the fourth gain value is greater than or equal to a threshold gain value;

reducing the fourth gain value to a fifth gain value that is less than the threshold gain value; and causing the loudspeaker to emit the ultrasonic signal at the fourth gain value.

13. A computing device comprising:

a loudspeaker;

a microphone;

one or more processors; and one or more computer-readable media storing computer-executable instructions that, when executed by the one or more processors, cause the one or more processors to perform operations comprising:

storing a first gain value associated with a first frequency response of the computing device emitting ultrasonic signals in a first ultrasonic frequency range;

storing a second gain value associated with a second frequency response of the computing device emitting ultrasonic signals in a second ultrasonic frequency range;

emitting, by the loudspeaker, an ultrasonic sweep signal into an environment, the ultrasonic sweep signal being emitted at least in the first frequency range and the second frequency range;

generating, at least partly using the microphone, first data representing reflected signals corresponding to the ultrasonic sweep signal;

receiving, from an application running on the computing device, an indication of a particular ultrasonic frequency range in which the application emits ultrasonic signals;

determining, using the first data, a first signal-metric value for the first ultrasonic frequency range, the first ultrasonic frequency range corresponding to the particular ultrasonic frequency range;

determining, using the first data, a second signal-metric value for the second ultrasonic frequency range, the second ultrasonic frequency range corresponding to the particular ultrasonic frequency range;

selecting, based at least in part on the first and second signal-metric values, the first ultrasonic frequency range;

determining, using the first gain value, an third gain value at which to emit an ultrasonic signal in the first ultrasonic frequency range; and emitting, by the loudspeaker, an ultrasonic signal using the third gain value and at a carrier frequency that is within the first ultrasonic frequency range.

14. The computing device of claim 13, the operations further comprising:

receiving, from the application, an indication of a distance between the computing device and a location in the environment;

determining an attenuation value indicating a measure of attenuation the ultrasonic signal experiences over the distance; and determining, using the attenuation value and the first gain value, the third gain value.

15. The computing device of claim 13, the operations further comprising:

causing the loudspeaker to emit the ultrasonic sweep signal at a fourth gain value; and determining, using the fourth gain value and the first gain value, the third gain value.

16. The computing device of claim 13, the operations further comprising:

determining, using the first data, first energy data that includes a first energy value associated with the reflection signals in the first ultrasonic frequency range;

determining, using the first energy value and the first gain value, second energy data that includes a second energy value; and determining the first signal-metric value using the second energy data.

17. The computing device of claim 13, the operations further comprising:

receiving temperature data indicating a temperature of the environment;

determining an attenuation value indicating a measure of attenuation the ultrasonic signal experiences due to the temperature of the environment; and determining, using the attenuation value and the first gain value, the third gain value.

18. The computing device of claim 13, the operations further comprising:

receiving humidity data indicating a humidity of the environment;

determining an attenuation value indicating a measure of attenuation the ultrasonic signal experiences due to the humidity of the environment; and determining, using the attenuation value and the first gain value, the third gain value.

19. The computing device of claim 13, the operations further comprising:

identifying, from memory of the computing device, a plurality of gain values associated with frequency responses of the computing device for different frequencies within the first ultrasonic frequency range; and determining that the first gain value is less than others of the plurality of gain values.

20. The computing device of claim 13, the operations further comprising:

identifying, from memory of the computing device, a plurality of gain values associated with frequency responses of the computing device for different frequencies within the first ultrasonic frequency range;

wherein identifying the first gain value includes calculating a root mean square (RMS) value of the plurality of gain values.

* * * * *